United States Patent [19]
You et al.

[11] Patent Number: 5,814,392
[45] Date of Patent: Sep. 29, 1998

[54] BOILING ENHANCEMENT COATING

[75] Inventors: Seung Mun You, Arlington; John P. O'Connor, Ft. Worth, both of Tex.

[73] Assignee: Board of Regents, The University of Texas System, Austin, Tex.

[21] Appl. No.: 716,227

[22] PCT Filed: Mar. 21, 1995

[86] PCT No.: PCT/US95/03607

§ 371 Date: Dec. 2, 1996

§ 102(e) Date: Dec. 2, 1996

[87] PCT Pub. No.: WO95/25603

PCT Pub. Date: Sep. 28, 1995

Related U.S. Application Data

[63] Continuation of Ser. No. 216,884, Mar. 23, 1994.

[51] Int. Cl.⁶ ............... B32B 15/08; C08K 3/00
[52] U.S. Cl. ............ 428/209; 427/386; 428/413; 523/440
[58] Field of Search ............ 427/386; 428/209, 428/210, 413, 418; 522/6; 523/440, 454, 456, 457, 468

[56] References Cited

U.S. PATENT DOCUMENTS

| | | | |
|---|---|---|---|
| 3,301,314 | 1/1967 | Gaertner | 165/1 |
| 3,412,043 | 11/1968 | Gilliland | 252/514 |
| 3,686,139 | 8/1972 | Lubin | 252/511 |
| 3,706,127 | 12/1972 | Oktay et al. | 29/576 |
| 4,050,507 | 9/1977 | Chu et al. | 165/1 |
| 4,479,890 | 10/1984 | Prabhu et al. | 252/508 |
| 4,537,632 | 8/1985 | Mosser | 106/14.12 |
| 4,544,623 | 10/1985 | Audykowski et al. | 430/280 |
| 4,786,437 | 11/1988 | Ehrreich | 252/506 |
| 5,051,208 | 9/1991 | Bowns et al. | 252/511 |
| 5,095,052 | 3/1992 | Delano et al. | 523/454 |

OTHER PUBLICATIONS

Anderson and Mudawar, "Microelectronic Cooling by Enhanced Pool Boiling of a Dielectric Fluorocarbon Liquid," *Journal of Heat Transfer,* 111:752–759, 1989.

Chowdhury and Winterton, "Surface Effects in Pool Boiling," *Int. J. Heat. Mass Transfer,* 28(10):1881–1889, 1985.

Frieser and Reeber, "Surface Treatments of Silicon to Enhance Thermal Nucleation," *Journal of Applied Electrochemistry,* 10:449–457, 1980.

Marto and Leper, "Pool Boiling Heat Transfer from Enhanced Surfaces to Dielectric Fluids," *Journal of Heat Transfer,* 104:292–299, 1982.

Thome, J.R., 1990, "Enhanced Boiling Heat Transfer," Hemisphere Publishing Corp., New York, NY; pp. 28–63, 78–90.

You et al., "Experimental Investigation of Nucleate Boiling Incipience with a Highly–wetting Dielectric Fluid (R–113)," *Int. J. Heat Mass Transfer,* 33(1):105–117, 1990.

(List continued on next page.)

*Primary Examiner*—Daniel Zirker
*Attorney, Agent, or Firm*—Arnold, White & Durkee

[57] ABSTRACT

A coating composition comprising a glue, a particulate material and a solvent, which imparts a surface microstructure to a coated object (29) is disclosed. The particulate material projects above the glue line (28) of the coated object creating the microstructure which provides boiling heat transfer enhancement. A horizontally oriented, rectangular surface immersed in FC-72, indicates up to an 85% decrease in incipient superheat, a 70% to 80% reduction in nucleate boiling superheats, and a ~109% increase in the critical heat flux (CHF), beyond that of the non-painted surface. The enhanced surface heat transfer coefficients are four to nine times higher than those from the reference surface. The coatings are applicable to electronic component surfaces. A coated silicon test chip tested at subcooled (45° C. conditions using FC-72 had heat dissipation rates of ~100 W/cm² at junction temperatures of ~85° C., and the highest CHF observed was 159 W/cm², 224% higher than that from the untreated chip surface at saturated conditions.

44 Claims, 13 Drawing Sheets

OTHER PUBLICATIONS

You et al., "A Technique for Enhancing Boiling Heat Transfer with Application to Cooling of Electronic Equipment," *IEEE Transactions on Components, Hybrids, and Manufacturing Technology,* 15(5):823–831, 1992.

Dialog Search dated Feb. 22, 1994.

"High Temperature and High Thermally Conductive Epoxies", 3 pages from OMEGA International Search Report, Jul. 26, 1995.

Orr, Kirk–Othmer Ency. of Chem. Tech., 3rd ed., John Wiley & Sons, New York, vol. 21, pp. 10–131.

BOILING ENHANCEMENT COATING

This is a United States filing under 35 U.S.C. §371 of international application Ser. No. PCT/US95/03607, filed Mar. 21, 1995 which was a continuation in part of U.S. Ser. No. 08/216,884, filed Mar. 23, 1994, pending.

BACKGROUND OF THE INVENTION

1. Field of the Invention

The present invention relates generally to the fields of immersion cooling and boiling heat transfer from a surface to a liquid. More particularly the invention relates to surface enhancements which increase the critical heat flux and reduce wall superheating by increasing boiling nucleation sites on the surface. The surface enhancements are accomplished by applying to the surface a composition comprising particulate elements, glue and a solvent, and then curing the applied material by evaporating the solvent.

2. Description of the Related Art

Boiling heat transfer is a method of dissipating high amounts of thermal energy. When evaluating the nucleate boiling heat transfer performance of a surface, three parameters should be considered. The first parameter is the wall superheat required to initiate boiling. The surface must reach the incipient wall superheat condition to initiate the nucleation process. The incipient wall superheat is inversely proportional to the volume of vapor/gas entrapped in a surface irregularity. The second performance parameter to be considered is the heat transfer coefficient in the nucleate boiling regime. Increasing the boiling heat transfer coefficient from the surface leads to lower surface temperatures. More heat is removed as the nucleation site density of the surface increases. The third boiling performance parameter to be considered is the Critical Heat Flux (CHF) which is the highest heat flux that can be removed without exposing the surface to film boiling.

Nomenclature

The following nomenclature is used throughout the application:

| | |
|---|---|
| $A_h$ | Projected Heater Surface Area (0.84 cm$^2$) |
| $A_j$ | Total Vapor Jet Cross-Sectional Area |
| $A_w$ | Heater Surface Area Feeding a Single Vapor Jet |
| CHF | Critical Heat Flux |
| g | Gravitational Acceleration |
| h | Heat Transfer Coefficient |
| $h_{fg}$ | Heat of Vaporization |
| κ | Thermal Conductivity |
| L | Length |
| R | Resistance or Thermal Resistance |
| $R_{tcond}$ | Total Conductive Thermal Resistance |
| $T_{bulk}$ | Test Liquid Temperature |
| $T_{ref}$ | Reference Surface (Aluminum Foil) Temperature |
| $T_{tc}$ | Thermocouple Temperature |
| $T_w$ | Paint or Heater Surface Temperature |
| ΔT | Wall Superheat ($T_{ref} - T_{bulk}$) |
| q | Heat Flux (W/cm$^2$) |
| $q_{maxz}$ | Zuber Critical Heat Flux |
| $\rho_f$ | Liquid Density |
| $\rho_g$ | Vapor Density |
| σ | Surface Tension |
| $\lambda_T$ | Taylor 1-D Wavelength |
| $P_{sat}$ | Saturation Pressure |
| $r_b$ | Embryonic Bubble Radius |
| $T_{crit}$ | Critical Temperature |

The mechanism which causes the CHF continues to be the focus of many investigations. Several theories exist which attempt to describe this mechanism. The most widely accepted theory was developed by Zuber (1959) for pool boiling on an infinite, upward facing, horizontal flat plate. Zuber's theory emphasizes the collapse of vapor escape routes from the heated surface due to hydrodynamic instabilities and leads to the following correlation:

$$q_{maxz} \equiv 0.131 \rho_g^{1/2} h_{fg} [\sigma g (\rho_f - \rho_g)]^{1/4} \qquad (1)$$

Equation (1) indicates that the CHF is independent of surface effects.

Studies focusing on boiling incipience and nucleation site distributions using non-highly wetting liquids (water, ether, methanol), Griffith and Wallis (1959), Hsu (1962), and Chowdhury and Winterton (1985), verify that surface roughness significantly affects incipient superheat and nucleate boiling heat transfer. Many studies have been conducted concerning boiling incipience using highly wetting dielectric liquids. A summary of these investigations conducted prior to 1986 can be found in Bar-Cohen and Simon (1988). In general, wide variations in incipience superheats were reported and theories for this phenomenon were presented. Bar-Cohen and Simon concluded commonly accepted incipience theories for non-highly wetting liquids can not be applied to highly wetting dielectric liquids. You et al. (1990a) observed wide variations (~20° C.) in incipience superheats in highly wetting dielectric liquids and noted incipience superheat levels as high as 73° C. for R-113 (DuPont). Further investigations by You et al. (1990b) showed similar results using FC-72 (3M Industrial Chemical Products, St. Paul, Minn.) and a silicon surface.

Advanced computational capability requires increased electronic signal speed, and this requirement is forcing the electronics industry to design miniaturized, highly integrated, high-density packaging of electronic components, all of which lead to higher component surface temperatures and elevated energy dissipation rates at the chip, module, and system levels. Boiling heat transfer via direct component immersion in a dielectric liquid is a possible means of providing heat transfer coefficients large enough to meet forecasted dissipation levels, while maintaining reduced component temperatures. Dielectric liquids (3M Fluorinert family) are attractive because they are chemically inert and electrically non-conducting. Their use with boiling heat transfer introduces significant design challenges which include reducing the wall superheat at boiling incipience, enhancing nucleate boiling heat transfer rates, and increasing the maximum nucleate boiling heat flux (CHF).

A number of investigations have been conducted using dielectric liquids and have focused on boiling heat transfer enhancement from electronic devices. Oktay and Schmeckenbecher (1972) mounted a dendritic heat sink on a silicon chip immersed in saturated FC-86 and reduced the junction temperature at incipience from 95° C. (plain chip surface) to 60° C. Chu and Moran (1977) achieved similar results using laser drilled holes ranging in diameter from 50 to 100 μm. Park and Bergles (1986) investigated micro-holed and micro-finned heat sinks generated by machining copper plates. They observed boiling heat transfer enhancement in saturated FC-72 primarily due to increases in heat transfer surface area. Anderson and Mudawwar (1988) attached mechanically manufactured heat sinks (drilled holes, micro-fins, inclined micro-fins) to flat, vertically oriented chips immersed in FC-72. The drilled surfaces provided minimal enhancement while the micro-finned surfaces showed significant enhancement, again due to an area increase greater than two. They also found that surface cavities of ~300 μm in diameter were ineffective in either lowering incipience superheats, or in enhancing nucleate boiling or the CHF in FC-72. Carvalho and Bergles (1990) mounted three commercially available heat sinks (Union Carbide High Flux, Hitachi Thermoexcel-E, and Wieland Gewa-T) on flat vertically oriented surfaces immersed in FC-72 and FC-87. They observed reductions in incipient and nucleate boiling superheats at saturated and subcooled conditions for all heat sinks, and indicated that the enhanced surfaces increased the CHF at all bulk liquid temperatures. They also identified a penalty for bonding the heat sinks on the heat source due to contact resistance, ~11° C. at 45 W/cm² (31° C. subcooling).

Marto and Lepere (1982) investigated the heat transfer enhancement of three commercially available surfaces (Union Carbide High Flux, Hitachi Thermoexcel-E, and Wieland GEWA-T) on cylindrical tubes immersed in liquids (saturated FC-72 and R-113). Their data concerning these materials indicate up to a 60% decrease in nucleate boiling superheats and negligible increases in the CHF. You et al. (1992) investigated a 0.3–3 $\mu$m alumina ($Al_2O_3$) particle treatment on a flat horizontal surface applied by a technique termed "particle spraying". They reported significant reductions in incipient and nucleate boiling superheats (~50%), and an increase of ~32% in the CHF. This increase in CHF contradicts the CHF correlation presented in Eq. (1), possibly because of its failure to account for surface effects. From the previously mentioned investigations, it is apparent that surface micro-structure of the correct size plays an important role in the enhancement of boiling incipience, nucleate boiling, and possibly CHF.

All of the enhancement techniques mentioned above have an inherent disadvantage with application to electronic equipment. The enhanced surfaces are fabricated by "baking" particles onto the surface (sintered or flame spraying), mechanically machining the surface structure, or using other methods of altering the surface such as laser drilling, vapor blasting, or sanding. These methods can not be readily applied directly to electronic equipment without damaging the components. If pre-manufactured heat sinks are bonded to the electronic devices, as pointed out by Carvalho and Bergles (1990), there is a junction temperature penalty associated with the contact resistance and may lead to excessive thermal stress.

What is needed therefore, is a benign surface enhancement treatment which will allow the boiling process to initiate at low superheat conditions, provide high heat transfer rates throughout the nucleate boiling region, and provide increased CHF levels without area enhancement. The present invention satisfies these needs through the use of compositions and methods wherein micron size cavities are added to a surface. These cavities are formed by affixing small particles to the surface with a polymer coating resulting in increased nucleation site densities.

SUMMARY OF THE INVENTION

The present invention overcomes these and other drawbacks inherent in the prior art by providing a surface enhancement which creates increased boiling nucleation sites, decreases the incipient superheats, increases the nucleate boiling heat transfer coefficient and increases the critical heat flux. This surface enhancement is particularly advantageous when applied to microelectronic components such as silicon chips that cannot tolerate the high temperature environment required to bond existing heat sinks onto the chip, or mechanical treatments such as sandblasting, and is also particularly advantageous when applied to phase change heat exchanger systems that require chemically stable, strongly bonded surface microstructures.

In a preferred embodiment, the present invention is a composition of matter which comprises a glue, a solvent and cavity-generating particles. This composition is applied to a surface and then cured by low heat or other means, including but not limited to air drying for example, which evaporates the solvent and causes the glue with embedded particles to be bonded to the surface. The embedded particles provide an increased number of boiling nucleation sites.

As used herein, "paint" means a solution or suspension which is in liquid or semiliquid form and which may be applied to a surface and when applied, can be cured to adhere to the surface and to form a thin layer or coat on that surface. The paint may be applied by any means such as spread with a brush, dripped from a brush or any other instrument or sprayed, for example. Alternatively, the surface may be dipped into the paint. By curing, is meant that the solvent will be evaporated, by exposure to the rays of a lamp, for example and the remaining composition which includes the suspended particles will adhere to the surface.

As used herein, "glue" means any compound which will dissolve in an easily evaporated solvent and will bond to the particles and to the target surface. Some types of glue will be more compatible with certain applications and all such types of such glue will fall within the scope of the present claimed invention. The glue to be used in the practice of the claimed invention would be any glue which exhibits the above mentioned characteristics and which is preferably a synthetic or naturally occurring polymer. Examples of types of glue that could be used in the present invention include ultraviolet activated glue or an epoxy glue, for example. Epoxy glues are well known glues which comprise reactive epoxide compounds which polymerize upon activation. Ultraviolet glues are substances which polymerize upon exposure to ultraviolet rays. Preferably such glues would include 3M 1838-L A/13 and most preferably the thermally conductive epoxies Omegabond 101 or Omegatherm 201 (Omega Engineering, Stamford, Conn.) and the like or any glue which would adhere to the surface and to the particles. Another preferred glue is a brushable ceramic glue. Brushable ceramic glue is a low viscosity, brushable epoxy compound. Preferred brushable ceramic glues have a viscosity of about 28,000 cps and a maximum operating temperature of about 350° F., and most preferred is Devcon Brushable Ceramic Glue. Thermally conductive epoxies are those with thermal conductivities in the range of about 7 to about 15 $BTU/(ft^2)$ (sec) (°F./in).

It is understood that the solvent is important primarily for its function of allowing the glue and particles to be spread in a thin layer over the target surface and then to evaporate in the curing process. Therefore any solvent, including but not limited to organic solvents with a boiling point, in one atmosphere of pressure, of about 50° C. to about 90° C. would be preferred, although any solvent which served the stated function would be understood to fall within the spirit and scope of the claimed invention. It is also understood that any solvent which will make the solution inviscid, dissolves the glue so that it comes into contact with all the particles and evaporates in low heat is an acceptable component of the present invention. Therefore, any highly evaporative, inviscid solvent such as isopropyl alcohol, acetone, methylethyl ketone, FC-72, or FC-87, for example, may be used, with isopropyl alcohol or methyl-ethyl ketone being the most preferred for certain embodiments.

The particles of the present invention may be any particles which would generate cavities on the surface in the manner disclosed herein. As used herein, "cavity-generating particles" means particles which when applied to a surface, or when fixed in a thin film on a surface, form depressions in the surface of from about 0.5 μm to about 10 μm in width, which depressions are suitable for promoting boiling nucleation. Preferred particles disclosed herein include crystals, flakes and randomly shaped particles, but could also include spheres or any other shaped particle which would provide the equivalent cavities. The particles are also not limited by composition. Such particles could comprise a compound such as an organic or inorganic compound, a metal, an alloy, a ceramic or combinations of any of these. One consideration is that for certain applications, the particles should be electrically non-conducting. Some preferred particles might comprise silver, iron, copper, diamond, aluminum, ceramic, or an alloy such as brass and particularly preferred particles are silver flakes or, for microelectronic applications, diamond particles, copper particles or aluminum. The size of the particles must be compatible with generating cavities for boiling nucleation sites and may be any size less than about 50 μm and more preferably 8–12 μm or less or even 1–3 μm in size.

Certain compositions of the present invention comprise the particles as discussed in the previous paragraph at a concentration of about 15 grams per 1 ml of glue. It is understood that the upper limit of concentration of particles is determined by the amount that can be embedded in the glue when cured, and that 15 grams/1 ml of glue has proven to be a workable concentration, but is not taken to be limiting in any way to the scope of the claimed invention. The particles may also be present at a concentration of less than 15 grams per 1 ml of glue or about 10 grams or even about 2 grams per 1 ml of glue as long as enough particles contact the target surface and enough nucleation sites are created by the particles to enhance the boiling heat transfer.

A preferred embodiment of the invention is a composition comprising solvent, glue and cavity-generating particles in a ratio of about 10 ml solvent to about 0.1 ml of glue to from about 0.2 grams to about 1.5 grams of cavity-generating particles. Alternatively, the preferred composition is in a ratio of about 10 ml solvent to 0.1 ml of glue to about 1.5 grams of cavity-generating particles. It is understood that compositions of different ratios will be applicable to different utilities and that the ratios disclosed herein are not limiting in any way to the scope of the claimed invention. For example, an embodiment of the present invention is a composition of matter comprising solvent, glue and cavity-generating particles wherein the composition is 85–98% (v/v) solvent, 0.5–2% (v/v) glue and 1.5–15% (w/v) cavity-generating particles. By % (v/v) is meant liquid volume of component divided by total volume of suspension. By % (w/v) is meant grams of component divided by 100 ml of suspension.

In an alternate embodiment, the present invention is a method of enhancing the boiling heat transfer of a surface in contact with a liquid comprising applying to the surface, a composition comprising solvent, glue and cavity-generating particles as defined in the preceding paragraphs. Any method of applying the composition to a surface that would have the effect of enhancing the boiling heat transfer would be included within the scope and spirit of the present claimed invention. The enhanced boiling heat transfer may include, but is not limited to any of the following manifestations, an increase in boiling nucleation sites, a decrease in incipient superheats, an increase in nucleate boiling heat transfer coefficient or an increase in critical heat flux.

The surface enhancement composition may be added to the surface in any manner appropriate to the particular application. For example, the composition may be painted or dripped onto the surface, or even sprayed onto the surface. Alternatively, the surface or object may be dipped into the composition of the present invention. Following any of these applications, the enhancing composition would then be cured. It is contemplated that the composition of the present invention may also be incorporated into the surface as it is being manufactured and the boiling heat transfer enhancement would be an integral part of the surface. All such applications, or any other manner of applying the composition to a surface would fall within the spirit and scope of the present claimed invention. When applied to a surface, the composition may form a layer of 270 μm or less in thickness after curing, or preferably it may form a layer of about 70 μm or less or even 40 μm or less in thickness after curing or even more preferably it may form a layer of about 23 μm in thickness after curing, with 25 μm or 70 μm being preferred for certain embodiments.

Another preferred embodiment of the present invention is an object having a heat convecting surface comprising cavity-generating particles of less than 50 μm in size affixed by a glue. Preferred particles comprising the surface include flakes and randomly shaped particles, but could also include spheres, crystals or any other shaped particle which would provide the equivalent cavities. The particles are also not limited by composition. Such particles could comprise diamond, silver, copper, aluminum, another metal, an alloy, a ceramic or combinations of any of these. One consideration is that the particles are thermally stable and for certain applications, the particles should be electrically non-conducting. Some preferred particles might comprise silver, iron, copper, diamond, ceramic, aluminum, an alloy such as brass and particularly preferred particles are copper, aluminum, silver flakes or, for microelectronic applications, diamond particles. The size of the particles must be compatible with generating cavities for boiling nucleation sites and may be any size less than about 50 μm and more preferably 8–12 μm or less, or even 1–3 μm.

The particles may be added to the surface after the object is formed by any of the methods disclosed herein such as painting, dripping, spraying or dipping, or the particles may be formed into the surface of the object during the manufacture of the object. The object may be, for example, a microelectronic component or preferably a silicon chip.

Certain embodiments of the invention are directed to methods of enhancing the boiling heat transfer of a surface in contact with a liquid. It is understood that the surface may be immersed, as in a liquid pool, or the liquid may be flowing past the surface, or the surface may be moving through the liquid, for example. The liquid may also be boiling or may be subcooled, in certain applications of the compositions and methods of the present invention. All such embodiments, and any others that comprise the contact of an enhanced surface with a liquid would fall within the spirit and scope of the present claimed invention.

DETAILED DESCRIPTION OF THE PREFERRED EMBODIMENTS

Figure 1:
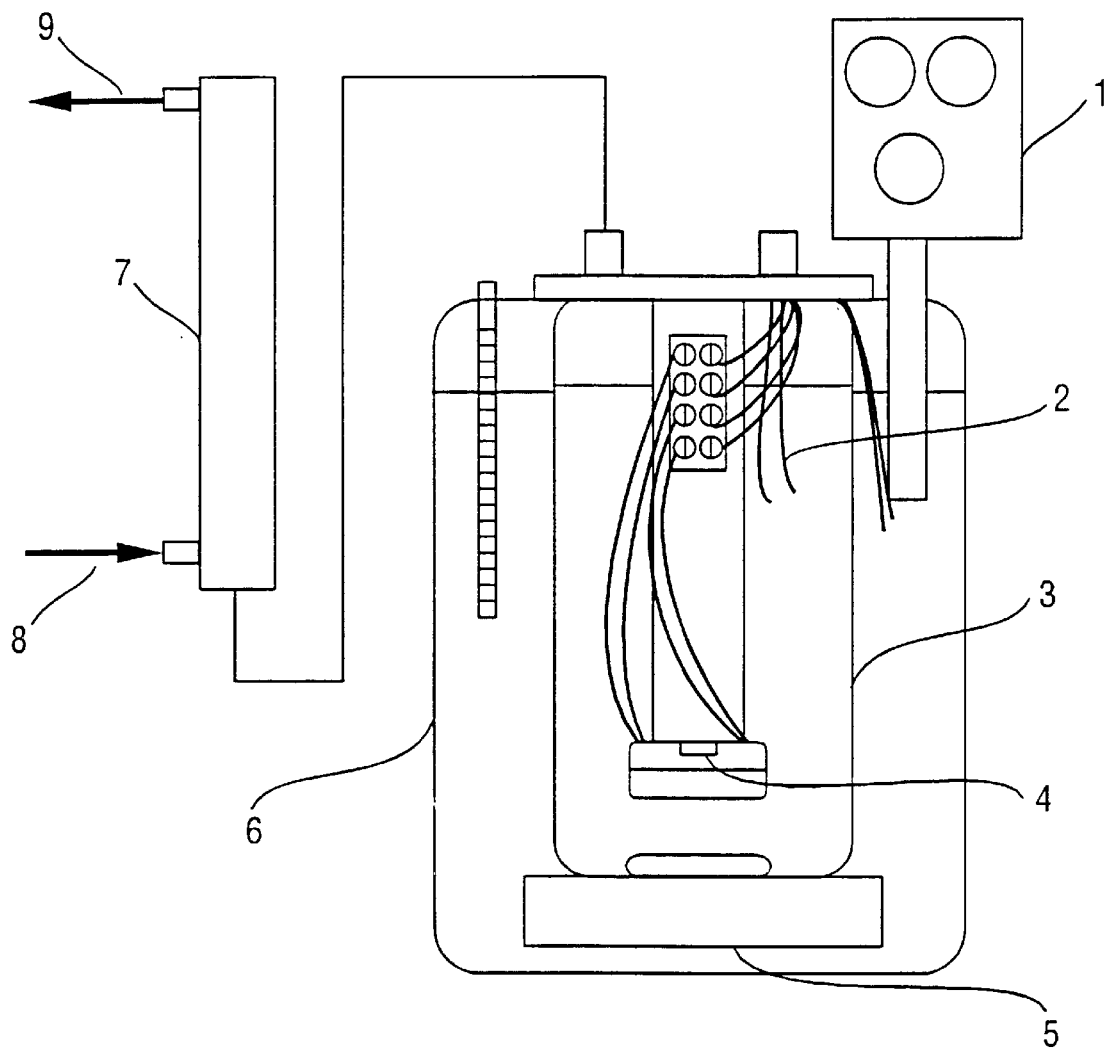
FIG. 1. The pool boiling test facility.

In its most preferred embodiments, the present invention is a boiling heat transfer enhancement paint. Unlike previously developed enhancement surfaces which serve to increase heat transfer surface area and internal vaporization, the current surface produces heat transfer enhancement primarily by increasing the number of active nucleation sites. Photographic observations of the bubble departure pattern occurring at the surface show significant differences between the painted and reference surfaces. These differences, along with SEM images, give insight into the mechanisms providing boiling heat transfer enhancement.

The most preferred compositions of the invention comprise silver flakes, aluminum, copper or diamond particles as the boiling nucleation site enhancing elements. These solids are prepared in a solution of a solvent and glue and then applied to the surface. The solvent is evaporated, resulting in an enhanced surface without subjecting the wall components to excessive heat or mechanical disturbances.

The silver flake painted surface exhibits repeatable and low incipience superheats (3° to 8.5° C.) which are ~70 to 85% lower than those for the reference surface, and the enhanced surface nucleate boiling superheats were 70 to 80% lower than those of the reference surface. This corresponds to an increase in boiling heat transfer, four (using $T_{ref}$) to nine (using $T_w$) times higher than the untreated reference surface.

In addition, a CHF increase of 109% (30 W/cm²) was provided by the silver flake paint enhanced surface for identical bulk liquid conditions. This increase is due to surface micro-structure and its influence on the heat transfer characteristics above the heated surface. Photographic observations revealed that the silver flake painted structure consistently produced many small bubbles throughout the entire boiling curve, including conditions just prior to CHF. This is unique and leads to enhanced boiling heat transfer mechanisms.

In an application of the present invention, electrically non-conducting surface micro-structures (diamond particles) were applied to a simulated chip and a Texas Instruments silicon test chip using a spray technique, You et al. (1992), and the painting method of the present invention.

All three micro-structures (sprayed alumina—0.3–5 µm, painted diamond—1–3 µm and 8–12 µm) lowered incipient superheats, enhanced nucleate boiling heat transfer, and increased the CHF.

Incipient superheat reductions for the simulated chip ranged from 33 to 55% for the sprayed alumina to 63 to 85% for the painted diamond surface micro-structures. The multi-layered diamond structures are believed to produce more re-entrant cavities leading to increased amounts of entrapped vapor. Simulated chip nucleate boiling superheats were reduced 70 to 80% by the painted 8–12 µm diamond micro-structures (40 to 60% by the sprayed alumina and painted 1–3 µm diamond micro-structures). If the paint thickness is accounted for, the painted diamond surface superheats would be reduced an additional 10 to 25%.

The simulated chip CHF was increased by ~12%, ~47%, and ~103%, for the painted 1–3 µm diamond, the sprayed alumina, and the painted 8–12 µm surface micro-structures, respectively. These levels of enhancement clearly indicate CHF mechanisms are significantly influenced by surface micro-structures and also illustrate the improvement provided by the painted 8–12 µm diamond paint. Combined surface enhancement and subcooling resulted in CHF increases of 171% (sprayed alumina) and ~224% (painted 8–12 µm diamond) above that of the untreated silicon test chip. The electronic cooling goal of 100 W/cm² was dissipated at a junction temperature of 85° C. by the sprayed alumina surface, and as indicated by the cited results, reductions in paint thickness on the test chip would provide the goal heat flux at junction temperatures below 85° C.

Pool Boiling Test Facility

The pool boiling test facility is illustrated in FIG. 1. The facility comprises two rectangular PYREX® jars, one serving as a container for the test liquid (3.8 liter) (3), the other (6), containing 22.7 liters of water, and serving as an iso-thermal bath. The immersion heater/circulator (1000 W) (4) resides in the water bath and controls bulk liquid temperature. A magnetic stirrer (5) reduces the time required to reach bulk liquid conditions and to degas the test liquid. Four copper-constantan thermocouples are employed (2), two for the test liquid and two for the water bath. The test liquid jar has a stainless steel cover plate with a heater support mounted to it. Two cover plate holes serve as a condenser and electronic harness port. An immersion heater/circulator (1) is placed in the isothermal water bath (6). The condenser port is connected to a Graham condenser (7) containing an inlet port (8) and an outlet port (9) for cooling water. One of the 3M Fluorinert liquids (FC-72) was selected as the preferred test liquid. FC-72 has a saturation temperature of 56° C. at 1 atm., and is electrically non-conducting, having a volume resistivity of $10^{15}$ Ω-cm. It is thermally and chemically stable to temperatures in excess of 200° C.

A PC with a 486/33 MHz processor is used to control the National Instruments data acquisition system. The data acquisition system and all instrumentation are networked through the LabWindow Version 2.3 operating environment using Quick Basic as the primary programming language. A National Instruments AT-GPIB interface board provides communication with a direct current power supply (HP Model 6038-A) via IEEE-488 interface cables. A precision resistor (0.0999 Ω±0.05%) is used to determine the current going through the heater.

Test Heater

Figure 2A:
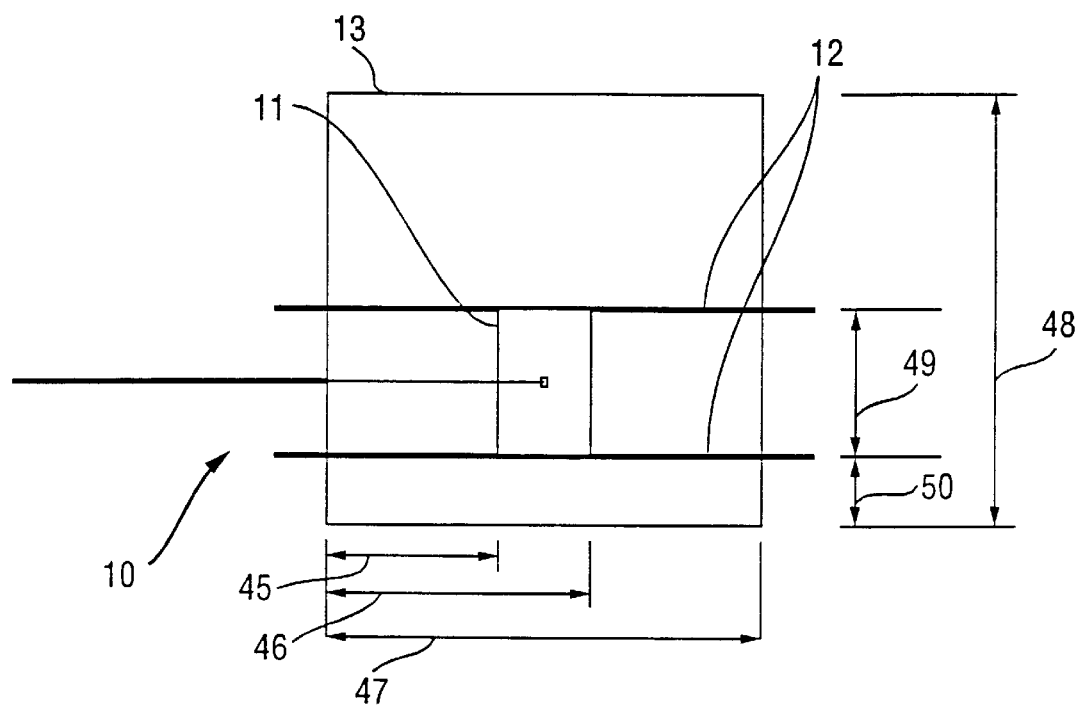
FIG. 2A. Top view of the heater and substrate.

The test heater is illustrated in FIG. 2A (top view). The heater (11) is rectangular in shape (0.51 cm×1.65 cm) and flush mounted to a square block (13) (5.08 cm×5.08 cm) of LEXAN so that its projected surface area (~0.84 cm²) is the only portion of the heater in direct contact with the test liquid. Two thin films, ~200 angstroms of nichrome base and ~900 angstroms of platinum, were bonded to a 1 mm thick piece of aluminum nitride (AlN) using sputtering and evaporation deposition techniques, respectively. The resulting heating element resistance was ~14 Ω. Based on work by Bar-Cohen and McNeil (1992), and Carvalho and Bergles (1990b), the heater thickness (~1 mm) was designed to provide CHF data free of thermal conductance/capacitance effects. Four tin/silver leads (12) were connected to each end of the heating element and provided voltage drop and measurement paths. A thin film (12.7 μm) thermocouple (10) was bonded directly to the center of the platinum heating element using an instant adhesive (3M CA4).

The distance shown by (45) is 2.28; the distance shown by (46) is 2.79; the distance shown by (47) is 5.08; the distance shown by (48) is 5.08; the distance shown by (49) is 1.65; and the distance shown by (50) is 0.86.

To provide a reference surface (FIG. 2B) to which the enhanced surface boiling performance could be compared, and also allow a means of easy application of the surface treatment, aluminum foil (~25 μm) (15) was bonded on top of the aluminum nitride surface (17) using 3M CA4 instant adhesive (16) (5±2 μm). The heating element (14) has two layers, Nichrome $Ni_{80}Cr_{20}$ (18), L=2.0E-8 (m), k=12.0 (W/m-°C.), R=2.0E-9 (m²-°C./W), and Platinum 99% (19), L=9.0E-8 (m), k=71.6 (W/m-°C.), R=1.0E-9 (m²-°C./W). The total conductive thermal resistance ($R_{tcond}$) between the thermocouple and reference surface (aluminum foil) is ~31.15×10⁻⁶ m²-°C./W. Using this resistance, the aluminum foil temperature ($T_{ref}$—the temperature on top of the aluminum foil surface) was estimated to be ~3.1° C. lower than that detected by the thermocouple ($T_{tc}$) at 10 W/cm².

Test Procedure

The magnetic stirrer and immersion heater/circulator are turned on and the test liquid is heated to the desired temperature. These conditions are maintained for approximately three hours to remove non-condensable gases. The magnetic stirrer is then turned off, the test heater is immersed in the liquid for 15 minutes, and data acquisition begins. Heat flux is increased in increments of less than 0.5 W/cm² by controlling power supply output voltage. At each power setting, the bulk liquid temperature is measured first.

For heat flux conditions less than ~80% CHF, steady-state conditions are verified by assuring that the heater temperature is time invariant. For increments of 0.5 W/cm², steady-state conditions were achieved within 20 seconds. After steady-state conditions prevail, a five second delay is encountered and the parameters required to calculate the heat flux (heater current and resistance) and steady-state surface temperature are measured and averaged, 3000 samples at a rate of 600 samples/second.

For heat flux conditions greater than ~80% CHF, after incrementing the heat flux, the heater surface temperature is immediately monitored for a 60 second time interval to prevent heater burnout. If the temperature increase between two subsequent measurements for a 0.055 second time interval is larger than 12° C., CHF conditions are assumed to exist and the power supply is immediately disabled. At 0.5 W/cm² increments, the average increase in heater surface temperature is less than 1.5° C. in the nucleate boiling regime. If CHF is not encountered, steady-state conditions are assumed to exist and the heat flux and surface temperature parameters are measured and averaged, 3000 samples at a sample rate of 600 samples/second, and the power supply is then incremented to the next heat flux. The superheat is calculated by subtracting the bulk liquid temperature from the reference surface temperature ($\Delta T = T_{ref} - T_{bulk}$). The reference surface temperature represents the aluminum foil temperature calculated from the measured thermocouple temperature ($T_{ref} = T_{tc} - q^*R_{tcond}$) as presented in FIG. 2B. If CHF conditions are met, the process for one run is complete, after which there is a five minute delay before another run begins.

Uncertainty Estimates

Using the method of Kline and McClintock (1953), uncertainty estimates were made for the heat flux and temperature measurements. The quoted uncertainties account for measurement resolution, instrumentation variance, geometric uncertainty, substrate conduction loss, and calibration error.

Substrate conduction losses were quantified at different heat flux conditions by solving three-dimensional conduction problems with a finite difference solver (FLUENT—1991). The heater and substrate were modeled as a composite solid and the natural convection heat transfer coefficients (Incropera and DeWitt—1990) were specified for each respective surface immersed in saturated FC-72. Boiling heat transfer coefficients were specified from experimental data. Losses varied between 8.2% and 1.2% for heat flux conditions between 0.5 W/cm² (single-phase natural convection) and 30 W/cm² (nucleate boiling), respectively, and compare favorably to those reported by Mukutmoni et al. (1993) for similar conditions. The other primary contributor to heat flux uncertainty was heater surface area. Combining these affects leads to overall uncertainty estimates in heat flux of 9.3% and 4.5% for single-phase (0.5 W/cm²) and nucleate boiling (30 W/cm²) conditions, respectively.

Figure 2B:
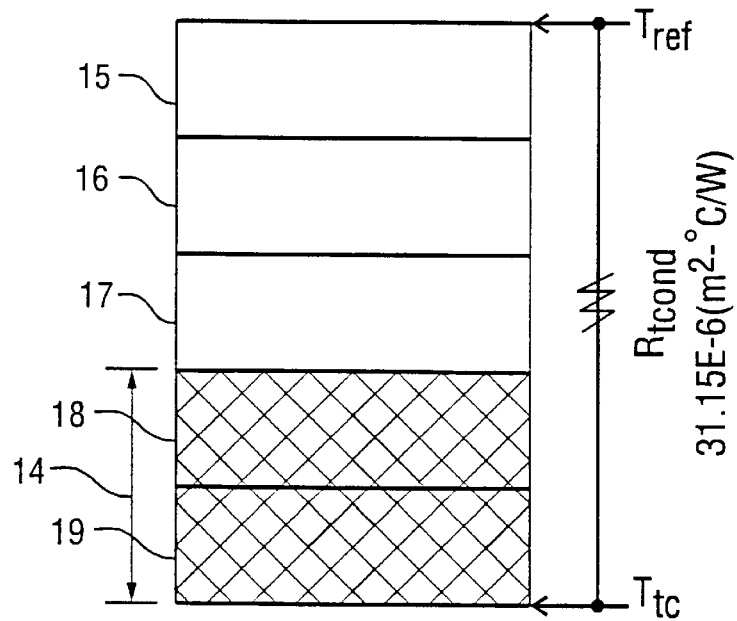
FIG. 2B. One dimensional heat transfer model.

Wall superheat uncertainty can be attributed primarily to thermocouple calibration (±0.5° C.) and the temperature correction from the thermocouple reading to the reference surface (primarily due to the 3M CA4 adhesive thickness—FIG. 2B). At 10 W/cm² the overall wall superheat uncertainty was estimated to be ±1.0° C.

Paint Composition Studies

Figure 13:
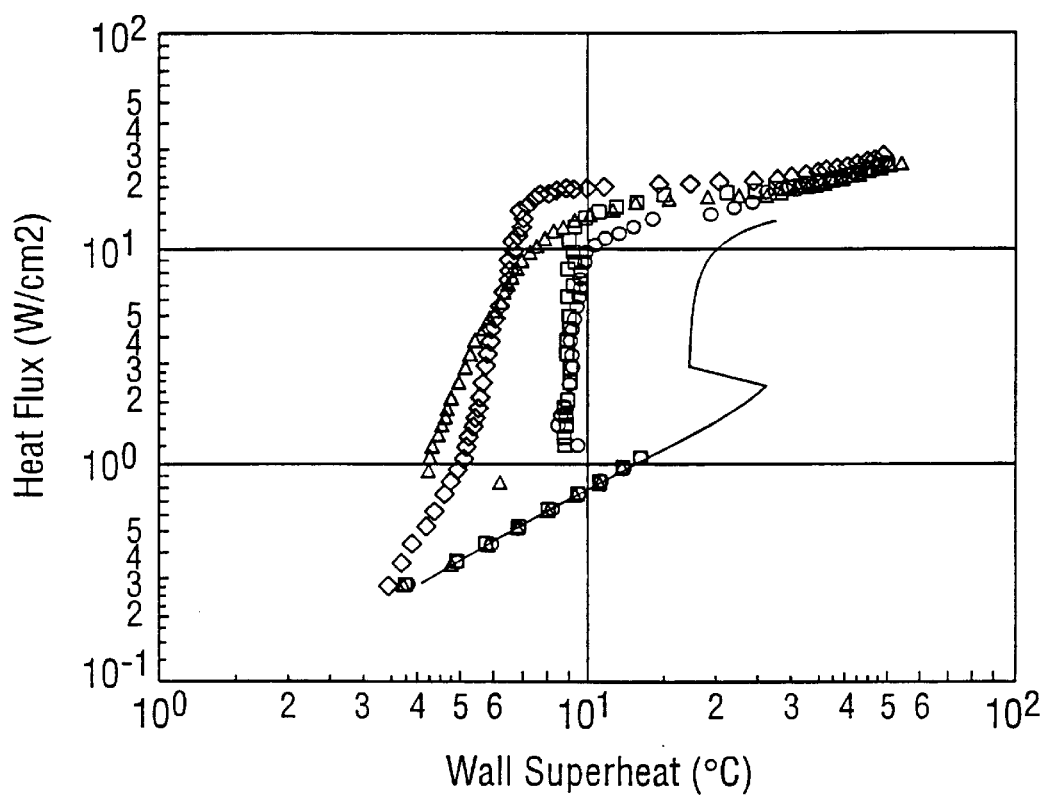
FIG. 13. Pool boiling data from silver flake paint composition study.
Figure 14:
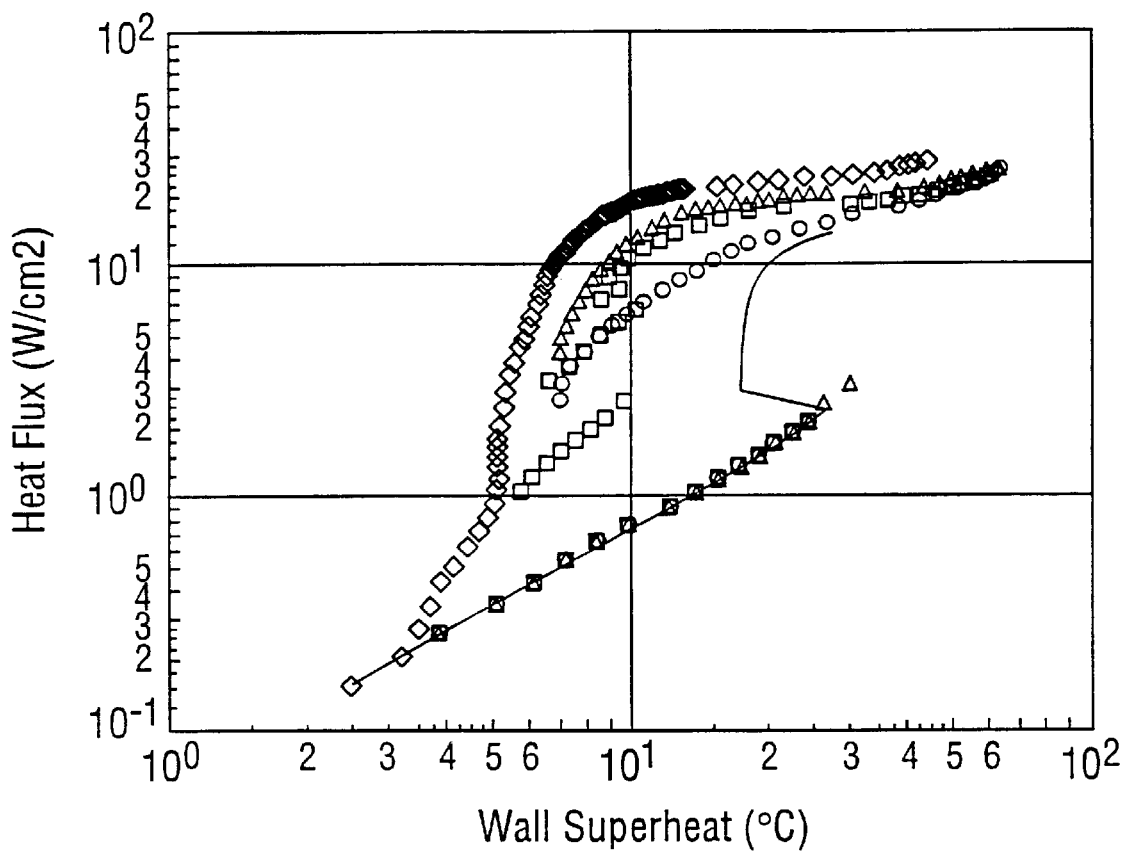
FIG. 14. Pool boiling data from diamond paint composition study.

Paint composition studies were carried out for both silver flake (FIG. 13) and natural diamond paints (FIG. 14). Four different mixtures were tested for each material. In FIG. 13, solid line is reference, CHF=14.3; open circle is silver flake 0.2 grams, CHF=27; open square is silver flake 0.5 grams, CHF=26.5; open triangle is silver flake 1.0 grams, CHF=26.7 and closed diamonds is silver flake 1.5 grams, CHF=29. In FIG. 14, solid line is reference, CHF=14.3; open circle is diamond paint 0.2 grams, CHF=26.4; open square is diamond paint 0.5 grams, CHF=24.6; open triangle is diamond paint 1.0 grams, CHF=26.3 and closed diamonds is diamond paint 1.5 grams, CHF=28. Each of the mixtures contained 10 ml of isopropyl alcohol, 0.1 ml of Omegabond 101 epoxy, and variations in the content (by weight) of each respective material (silver flake or diamond). The data identify the superheat sensitivity to particle content possibly indicating the generation of an increased number of nucleation sites with increased material content. Each of the paint mixtures provide similar Critical Heat Flux (CHF) enhancement. From the two composition studies, 1.5 grams of material was selected and used to generate the data contained in each of the following examples unless indicated otherwise. It is understood that this concentration is believed by the inventors to be the best composition for the practice of the invention, however, any amount of particulate additive in the surface enhancement paint which would provide enhanced boiling heat transfer over the reference material could be used and would fall within the spirit and scope of the present claimed invention.

The following examples are included to demonstrate preferred embodiments of the invention. It should be appreciated by those of skill in the art that the techniques disclosed in the examples which follow represent techniques discovered by the inventors to function well in the practice of the invention, and thus to constitute the more preferred known modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Silver Flake Boiling Enhancement Paint

This example demonstrates the boiling heat transfer enhancement afforded by a silver flake containing paint when applied to a test aluminum foil surface.

Enhancement Paint and its Application

The boiling enhancement surface paint used in the present example treatment is a mixture of 1.5 grams of silver flakes (3–10 $\mu$m), 0.1 ml of Omegabond® 101 thermal epoxy, and 10 ml of isopropyl alcohol. This particular paint composition was determined by conducting a study which systematically varied the silver flake content in the mixture, and was found to provide the highest level of enhancement throughout the boiling curve. The paint may be applied to the reference (aluminum foil) surface using a "dripping" technique. When applying the paint, the least amount of solution which allows the entire reference surface to be covered with silver flakes is desired. The current geometry requires three drops from a small brush and results in a paint thickness of ~25 $\mu$m. After application, the paint is cured under a lamp at ~80° C. for ~100 minutes. During cure, the alcohol evaporates and the mixture of flakes and epoxy adhere to the surface.

Figure 3:
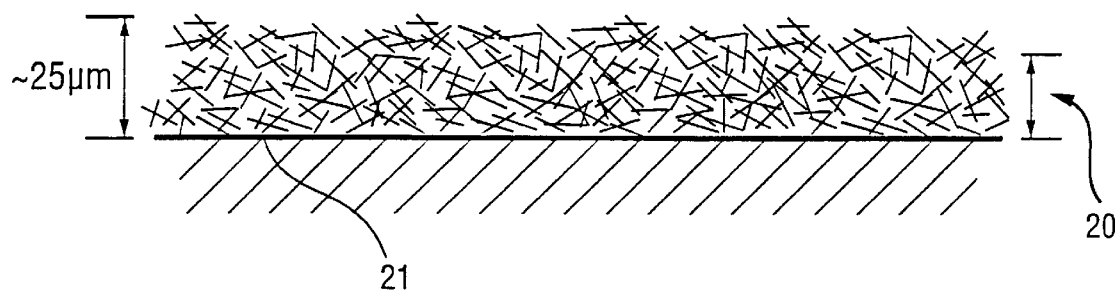
FIG. 3. Theoretical silver flake painted surface cross-section.

A Scanning Electron Microscope (SEM) image (×1000) of the reference surface (aluminum foil) showed a sparse number of small cavities (<1 $\mu$m), a "smooth" surface in the boiling sense. An SEM image (×1000) of the enhanced silver flake surface revealed that the flake orientation is random, some lying horizontally, some vertically, and some in-between. A theoretical model of the enhanced surface micro-structure is illustrated in FIG. 3. This illustration represents a cross-sectional cut through the enhancement paint and reference surface (21). A 25 $\mu$m thick microstructure is shown and is consistent with the SEM image. It is believed that a glue layer of finite thickness (20) holds the flakes together and bonds them to the surface. The multi-layered flake structures result in increased nucleation sites above the glue layer which are believed to provide re-entrant cavities. This structure intuitively appears beneficial for the entrapment of vapor and the generation of nucleation sites. It should be noted that the current enhanced structure is one to two orders of magnitude thinner than previously manufactured enhancement surfaces, a summary of which is given by Thome (1990).

Results

Figure 4:
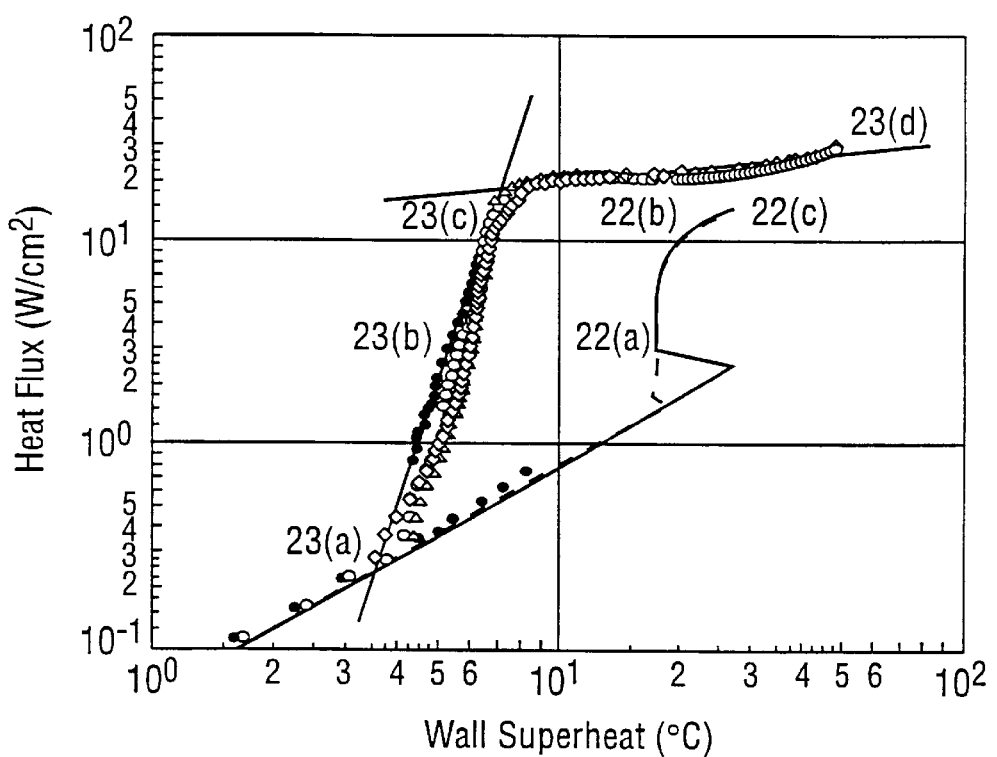
FIG. 4. Data from boiling heat transfer enhancement studies.

FIG. 4 compares pool boiling data for the reference and enhanced surfaces at identical bulk liquid conditions. The observed differences in the boiling curves is an indication of variations in surface micro-structures between the reference and enhanced surfaces. A comparison of the bubble behavior above the surfaces will aid in understanding these enhancement characteristics. Seven points are identified in FIG. 4, three along the reference surface curves, 22(*a*), 22(*b*), and 22(*c*), corresponding to heat flux conditions of ~4, ~13, and ~14.3 W/cm$^2$ (CHF), respectively, and four along the enhanced surface curves, 23(*a*), 23(*b*), 23(*c*), and 23(*d*), corresponding to heat flux conditions of 0.3, 4, 14, and 30 W/cm$^2$ (CHF), respectively.

Photographs, magnified ~3.8, were taken of the bubble behavior for the seven points from FIG. 4 and bubble sizes were estimated by scaling them from the heater length (1.65 cm). The photograph corresponding to point 22(*a*) showed discrete bubble growth and departure behavior with departure diameters of ~0.7 mm, in good agreement with those predicted by the Cole and Rohsenow (1968) correlation (0.8 mm) applied to saturated FC-72. This behavior was observed from the reference surface between 4.0 and 9.0 W/cm$^2$, with the amount of bubble coalescence above the surface increasing with increasing heat flux conditions. At point 22(*b*) two vapor columns are seen departing from the reference surface. It is believed that the bubble departure frequency is sufficiently large so that the distance between departing bubbles is less than one bubble diameter causing bubble coalescence from an individual site as well as adjacent sites. The two vapor columns are separated by a distance approximately equivalent to the Taylor 1-D wavelength (~8 mm for FC-72). The photograph at point 22(*c*) shows the bubble behavior just prior to CHF. Large vapor patches (~6 mm) are in contact with the surface, and the transition to film boiling is evident. The last two points identify bubble coalescence resulting in increased thermal resistance over the heated surface.

For the enhanced surface, at low heat flux conditions near boiling incipience, discrete bubbles less than 0.2 mm departed from the entire enhanced surface. Referring to FIG. 4, the pool boiling data for the reference and enhanced 3–10 $\mu$m silver flake surfaces can be compared. The solid line represents the initial run and the dashed line runs 2 and 3 from the reference surface. The symbols represent enhanced surface boiling curve data for five runs (black symbols—initial run). Incipience superheat values for the reference surface range from ~20° to 27° C., whereas for the enhanced surface they range from ~3° to 8.5° C. The small bubble growth and departure behavior was observed up to a heat flux of ~1.2 W/cm$^2$.

For highly wetting liquids (e.g. FC-72), Bar-Cohen and Simon (1988) suggested a correlation relating the vapor pressure required to activate nucleation to the embryonic bubble radius and surface tension. Using their correlation and the measured incipient superheats, the calculated embryonic bubble radius for the reference surface ranged between 0.1 $\mu$m and 0.15 $\mu$m, and for the enhanced surface between 0.5 $\mu$m and 2.0 $\mu$m. This increase (three to twenty times) indicates the ability of the enhancement paint to effectively trap vapor. The computed embryonic bubble sizes for the enhanced surface are in good agreement with the apparent structure sizes existing among the 3–10 $\mu$m flakes (FIG. 3). Another mechanism which possibly reduces incipient superheat further is expediting the growth of the superheated liquid layer. The liquid layer adjacent to the heated surface becomes superheated via transient conduction (Hsu, 1962). For the smooth reference surface, this conduction path is through the liquid (FC-72) having a thermal conductivity of 0.057 W/m–°C. The silver flakes have a thermal conductivity ~7000 times higher than FC-72 and expedite liquid heating on a microscopic scale adjacent to the embryonic bubble.

At point 23(*b*) fully developed nucleate boiling (1.2<q<10 W/cm$^2$) was seen indicating discrete bubble growth and departure behavior. Bubble departure sizes ~0.5 mm are observed at 4 W/cm², ~30% smaller than those departing the reference surface at the same heat flux, point 22(*a*). The photograph at this point also identifies an increased nucleation site density compared to the reference surface, evident by the larger number of isolated bubbles over the surface. In this heat flux region bubble departure size increases but remains isolated, and the amount of bubble coalescence above the surface increases with increasing heat flux. A photograph taken at point 23(*c*) illustrates typical bubble behavior at heat flux values between 10 and 19 W/cm². Unlike the reference surface points 22(*b*) and 22(*c*), the enhanced surface produces many small bubbles (0.5–0.7 mm) adjacent to the surface, the majority of which coalesce into large vapor "mushrooms" above the surface.

Point 23(*d*) is just prior to CHF (q~30 W/cm²). Small bubbles (~0.7 mm) are observed adjacent to the enhanced surface, quite different than the bubble behavior just prior to CHF above the reference surface 22(*c*). These bubbles appear to feed large vapor mushrooms hovering over the surface. As the heat flux was increased from ~19 W/cm² to the CHF condition, bubble coalescence into the vapor mushrooms was observed to occur closer to the heater surface. A comparison of the bubble departure behavior from the reference and enhanced surfaces indicates a significantly higher number of small bubbles existing above the enhanced surface at all heat flux conditions, including just prior to CHF. This difference in bubble departure behavior leads to increased levels of heat transfer.

From the enhanced surface boiling curve shown in FIG. 4, two distinct nucleate boiling regions exist and are identifiable by the two nucleate boiling curve slopes. The lower nucleate boiling region (q<~19 W/cm²) has a log-log slope of ~6.0. The higher nucleate boiling region (q>~19 W/cm²) has a decreased slope (~0.25). Gaertner (1965) observed a similar change in slope during steady-state nucleate boiling conditions using water and a polished copper surface, and proposed the slope change (5.5 to 0.6 for his data) was caused by regions of local film boiling over the heated surface. The enhanced surface provides reductions of 70 to 80% in nucleate boiling superheats (q<~19 W/cm²) by increasing the nucleation site density on the surface. The nucleate boiling data are repeatable, illustrated by the good comparison of all five runs.

The enhanced surface CHF (q~30 W/cm²) is 109% higher than the reference surface CHF (q~14.3 W/cm²) for ostensibly identical test conditions. Therefore, it is evident that the micro-structure provided by the 3–10 μm silver flakes play a dominant role in increasing the CHF. The reference surface CHF compares favorably with the predicted CHF value from Zuber's correlation (13.98 W/cm²). Based upon hydrodynamic theory, Zuber assumed the ratio of vapor jet area to heater surface area ($A_j/A_w$) was π/16. It also appears that $A_j$ for the enhanced surface is larger than for the reference surface. An area ratio ($A_j/A_w$) increase of 109% is required to obtain the enhanced surface CHF. The trend compares well with the photographic observations, but $A_j$ is indeterminate for either surface.

Another CHF model developed by Haramura and Katto (1982) is based on bubble characteristics observed by Gaertner (1965). His observations closely resemble the phenomenon observed above the enhanced surface at point 23(*d*), where large vapor mushrooms resting on top of a thin liquid film are nourished by columnar vapor stems. Haramura and Katto proposed that vapor blanketing results from Helmholtz instability of the vapor stems causing their collapse and the blanketing of the large vapor mushrooms onto the heated surface. Their correlation provides a CHF similar to that provided by Zuber (Eq. 1). Existing CHF models have had formidable success in predicting CHF values from smooth surfaces and strongly indicate that hydrodynamic mechanisms dominate CHF, even from enhanced (non-smooth) surfaces. The present invention will allow systematic investigations to be conducted focusing on bubble behavior at the CHF point from different heater surface micro-structures. Such investigations are expected to lead to a means of introducing surface effects into existing hydrodynamic models.

Heat Transfer Coefficient Determination and Comparison

Figure 5:
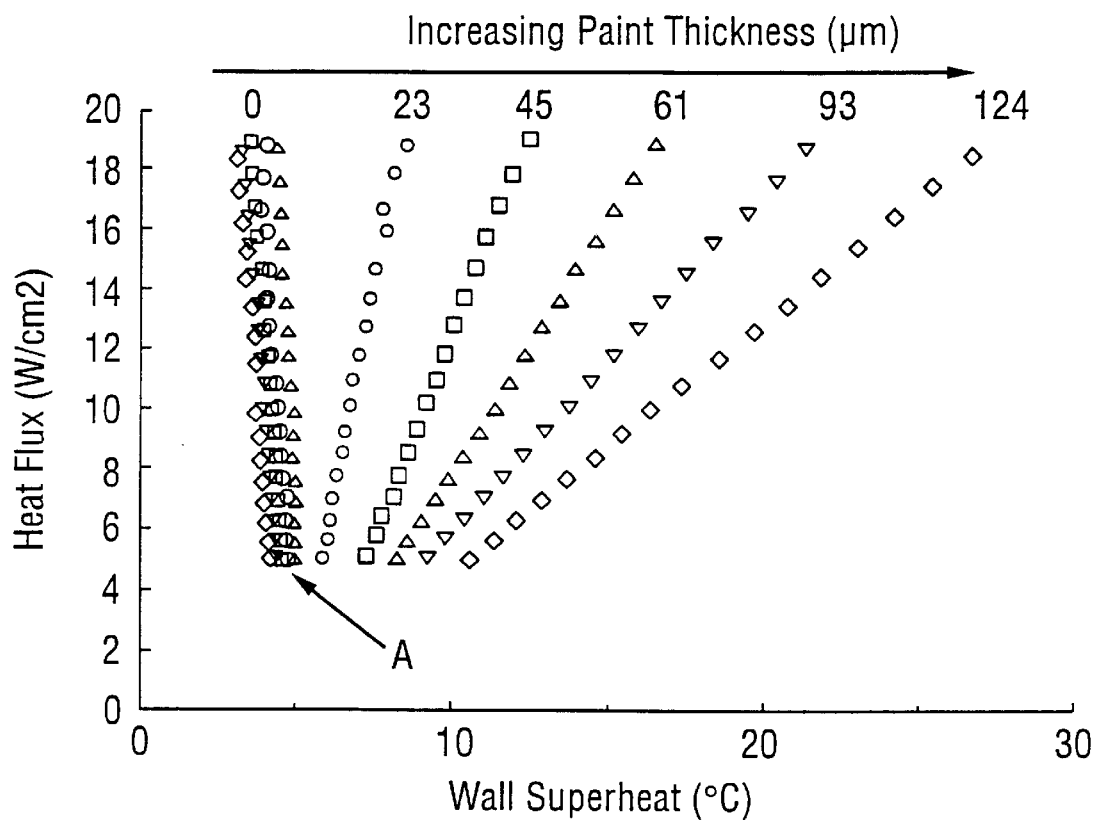
FIG. 5. Result of increasing paint thickness.

FIG. 5 summarizes an investigation which was conducted to determine the penalty associated with application of the enhancement paint. A single paint mixture was fabricated (1.5 grams silver flakes/10 ml alcohol/0.1 ml glue) and the enhancement paint thickness was systematically increased by applying successive layers on the reference surface. Pool boiling data between 5 and 19 W/cm² was generated for five enhanced surfaces, each having a different paint thickness; 23, 45, 61, 93, and 124 μm (±3 μm). For a given heat flux, as the paint thickness increases the wall superheat increases due to additional thermal resistance.

Figure 6:
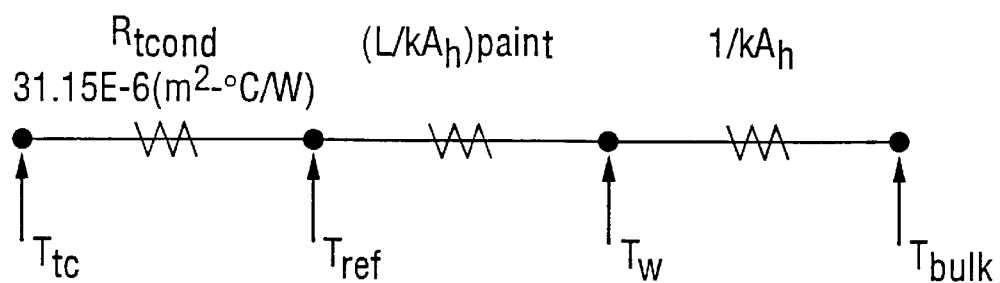
FIG. 6. One dimensional thermal circuit.

FIG. 6 illustrates a one dimensional thermal circuit between the thermocouple ($T_{tc}$) and bulk liquid ($T_{bulk}$). It includes the thermal resistance due to the enhancement paint between the reference surface ($T_{ref}$) and paint surface ($T_w$). If it is assumed that identical boiling surface conditions exist for all five paint thicknesses, the paint surface temperature ($T_w$) is fixed for a given heat flux. With this assumption, the thermal conductivity of the paint was estimated (0.95 W/m–°C.) from the data shown in FIG. 5, and the paint surface temperature ($T_w$) was calculated from the following expression ($T_w = T_{ref} - q^*(L/\kappa)_{paint}$). Superheats based on the paint surface temperature ($\Delta T = T_w - T_{bulk}$) were calculated for all five enhanced surfaces and are plotted in FIG. 5 (open symbols). These superheats represent enhanced conditions with zero paint thickness. The assumption of identical boiling surface conditions is appropriate as seen by convergence of the corrected data ($T_w - T_{bulk}$) to within a ±1° C. band.

Figure 7:
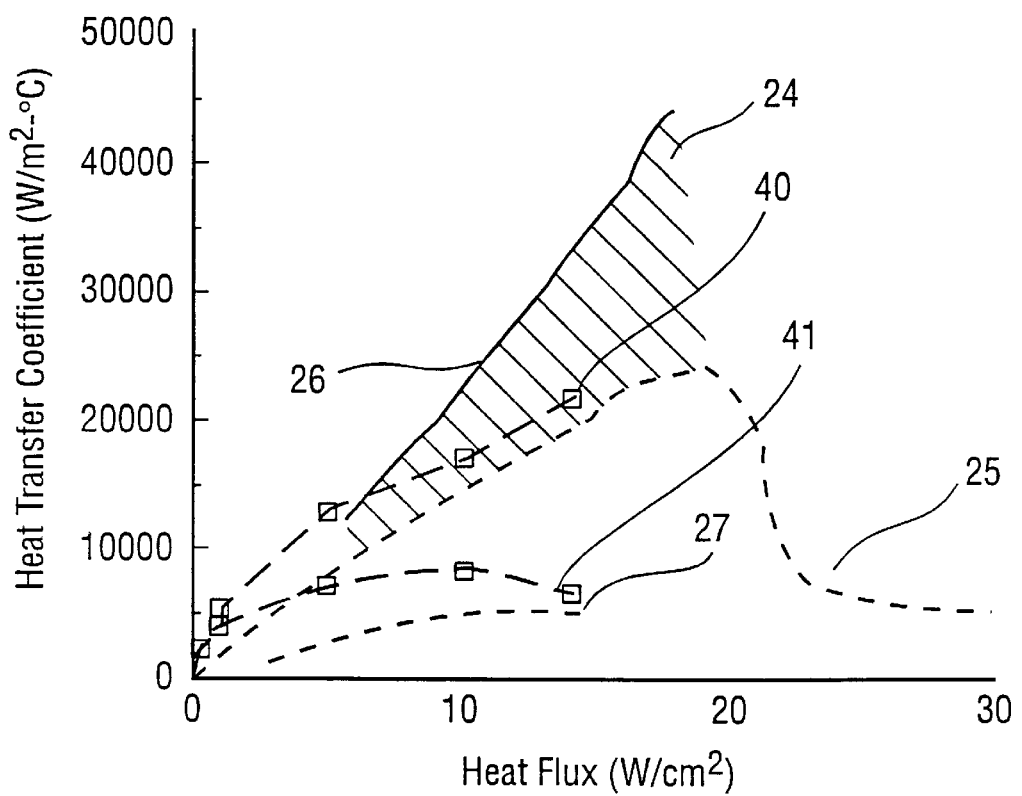
FIG. 7. Comparison of heat transfer from reference and silver flake painted surfaces. Data for High Flux and Thermoexcel-E (Marto and Lapere, 1982) is also included.

FIG. 7 compares boiling heat transfer coefficients generated from the reference (27) and enhanced surfaces. The coefficients for the reference surface (27) were calculated based upon the temperature difference between the reference surface and bulk liquid ($T_{ref} - T_{bulk}$). The reference surface heat transfer coefficient increases from ~1680 to 5200 W/m²–°C. Two different heat transfer coefficients were generated using the enhanced surface data illustrated in FIG. 4 (23 μm thick). The first uses the reference surface temperature ($T_{ref} - T_{bulk}$) and is represented by the line made of short dashes (25) (FIG. 7). The second, represented by the solid line between 5 and 19 W/cm², (26) (FIG. 7) is calculated using the paint surface temperature ($T_w - T_{bulk}$). The heat transfer coefficients provided by the enhanced surface must lie in the shaded region (24) depending on the definition of h. The enhanced surface heat transfer coefficient (based on $T_{ref}$) increases to 24600 W/m²–°C. at a heat flux of ~19 W/cm², then decreases dramatically and levels off at approximately 6000 W/m²–°C. near the CHF point. The dramatic decrease (in h) beyond 19 W/cm² is attributed to the gradual increase in the number of localized regions of film boiling existing on the heated surface (similar to observations made by Gaertner—1965). The enhanced surface increases the heat transfer rate from three (based on $T_{ref}$) to nine (based on $T_w$) times above that of the reference surface.

For comparative purposes, High Flux (40) and Thermoexcel-E (41) data from Marto and Lepere (1982) is also illustrated in FIG. 7. The Union Carbide High Flux surface provides heat transfer coefficients comparable to those obtained from the current enhanced paint surface (based on $T_{ref}$). Both the current enhanced surface and High Flux surface provide considerable heat transfer enhancement compared to the Hitachi Thermoexcel-E surface.

There are significant differences in the heat transfer enhancement mechanisms between the present enhanced surface and all previously developed enhanced surfaces (High Flux, Thermoexcel-E, Gewa-T and others). The thickness of the previously developed enhancement structures varies between ~300 and ~3000 $\mu$m (Thome 1990), one to two orders of magnitude thicker than the present paint (25 $\mu$m). This increased thickness results in a heat transfer surface area increase of up to ten times the projected surface area. The present enhancement paint does not increase the heat transfer surface area as seen by the natural convection data shown in FIG. 4. In addition, the feature size in previously developed structures is at a minimum, 50 $\mu$m (High Flux), whereas the feature size in the current paint is on the order of ~1 $\mu$m.

Studies outlined by Thome (1990) for porous enhanced surfaces indicate increased boiling heat transfer coefficients with increasing structure thickness. These improvements are the result of internal vaporization (increased latent and micro-convection heat transfer rates as discussed by Thome—1990) inherent in the porous structure. FIG. 5 indicates that boiling heat transfer coefficients based on $T_w$ are independent of the current enhancement paint thickness and those based on $T_{ref}$ decrease with increasing paint thickness. Additionally, nominal bubble departure sizes in saturated FC-72 are ~700 $\mu$m, approximately 30 times larger than the current paint thickness. These results indicate that although internal vaporization may exist in the current paint structure, its contribution to heat transfer is minimal. The authors believe that the heat transfer enhancement mechanisms associated with the current paint are primarily related to increases in active nucleation site density.

EXAMPLE 2

Diamond Flake Microsurface

This example illustrates the use of electrically non-conducting particles which can be applied to microelectronic components.

Enhanced Surface Micro-Structures

In this example, a previously developed method, "spraying" and the "dripping" method of the current invention, are used to apply the enhancement micro-structures on a chip surface for comparison purposes. These techniques introduce no mechanical or thermal stress, and therefore no degradation of electronic component functionality. Electrically non-conducting alumina and diamond particles are used to provide the surface micro-structures, each having electrical resistivities of $10^{15}$ and $10^{16}$ $\Omega$-cm, respectively. A spraying application technique, You et al. (1992), is used to apply the alumina particles (0.3–5 $\mu$m) on the surface, resulting in a surface micro-structure consistent with that reported by the developers of the method.

Figure 8:
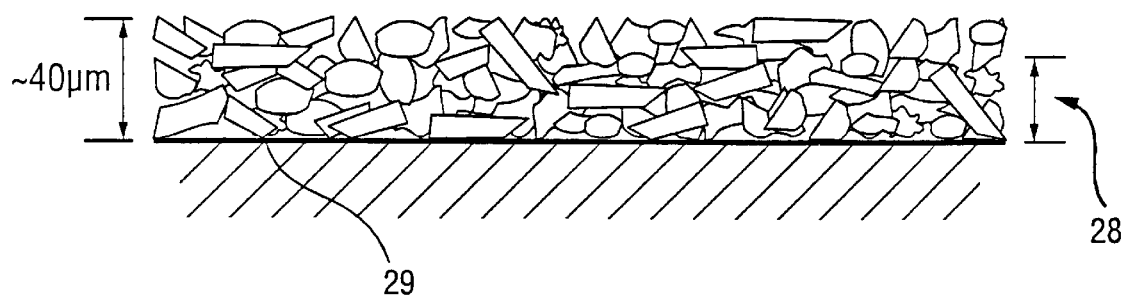
FIG. 8. Theoretical 8–12 µm painted diamond surface cross-section.

A complete discussion of the dripping application technique is given in Example 1, above. This method is used to attach the diamond particles to the surface. A diamond paint composition study was conducted and the solution providing the optimum boiling heat transfer enhancement contains 10 ml of isopropyl alcohol, 1.5 g of diamond particles (1–3 $\mu$m or 8–12 $\mu$m), and 0.1 ml of Omegabond 101 thermal epoxy. The resulting diamond paint thickness to adequately cover the surface is ~40 $\mu$m. Scanning Electron Microscope (SEM) images of the 1–3 $\mu$m and 8–12 $\mu$m diamond paint surface micro-structures (×1000), revealed that the cavity feature size for the 1–3 $\mu$m particles is smaller than those for the 8–12 $\mu$m particles. Both surface micro-structures appear beneficial for the entrapment of embryonic vapor/gas bubbles. FIG. 8 illustrates a theoretical model of the 8–12 $\mu$m surface micro-structure and is consistent with the SEM image. This figure represents a cross-sectional cut through the paint and reference surface. A finite layer of glue is believed to hold the diamond particles together and to bond them to the surface. As discussed in Example 1 for the silver flake enhancement structure, the diamond paint is one to two orders of magnitude thinner than previously manufactured enhancement surfaces. Therefore, the heat transfer enhancement mechanisms for this structure are attributed to increases in active nucleation site populations, not to heat transfer surface area increases or internal vaporization processes which dominate the enhancement mechanisms from all previously developed enhancement structures.

Sprayed Alumina Micro-Structure Enhancement

Figure 9:
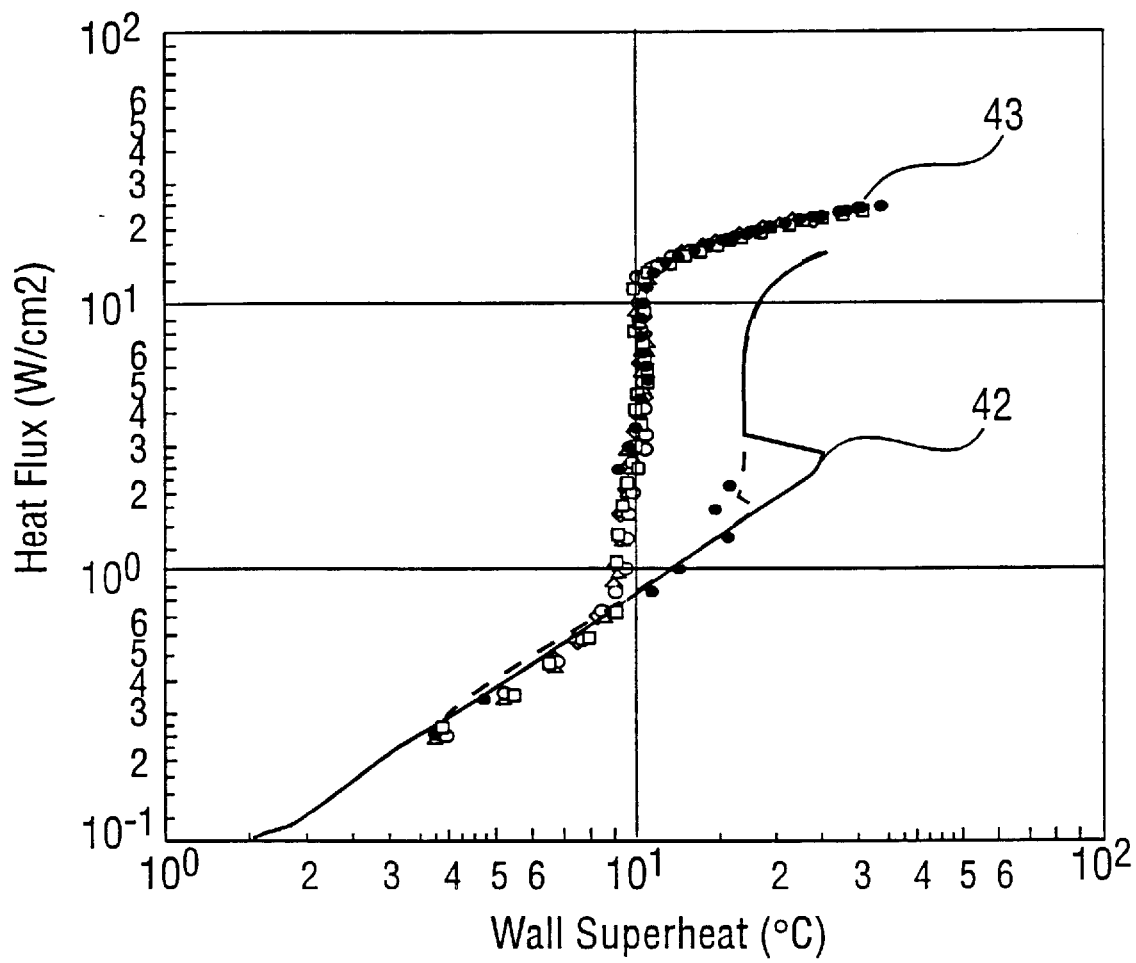
FIG. 9. Pool boiling data from reference surface and sprayed alumina surface.

FIG. 9 illustrates pool boiling data for the reference surface (42) (CHF=14.3 W/cm$^2$). The solid line represents the initial run, and the dashed line represents runs 2 and 3. Incipient superheat values range from ~20° to 27° C. Five boiling curves are illustrated in FIG. 9 which were generated from the 0.3–5 $\mu$m alumina sprayed surface (black symbols—initial run) (43) (CHF=21.1 W/cm$^2$). There is a negligible increase in heat transfer surface area from the sprayed surface, as seen by the natural convection data. On the initial run, incipience occurs at a superheat of ~18° C., and on subsequent runs the incipient superheat decreases to ~9° C. and appears repeatable. The approximate 50% reduction in incipient wall superheat is in good agreement with that reported by You et al. (1992) for the same surface treatment on a thin film heater.

The sprayed alumina surface nucleate boiling superheats are ~40 to 60% lower than those from the reference surface (FIG. 9), showing excellent agreement with those observed by You et al., 1992). Nucleate boiling data for all five runs are repeatable and have a log-log slope of ~12 up to a heat flux of ~12 W/cm$^2$, higher than that predicted using Rohsenow's (Rohsenow, 1962) correlation (~3). Beyond 12 W/cm$^2$, the slope of the nucleate boiling curve decreases to ~0.4. Gaertner (1965) proposed the slope change was due to regions of local vapor patches over portions of the heated surface which reduce the rate of heat transfer from the surface. You et al.'s (1992) thin film heater data do not indicate the decreased slope nucleate boiling region. It is theorized that due to the thickness of the thin film (~0.1 $\mu$m) and its relatively low thermal capacity, the existence of any localized film boiling spreads instantaneously over the heater, resulting in an earlier CHF occurrence.

The sprayed alumina surface CHF (21.1 W/cm$^2$) is 47% higher than that of the reference surface (14.3 W/cm$^2$). You et al. (1992) reported a CHF increase of ~36% for the same surface treatment. Based on the correlations of Bar-Cohen and McNiel (1992), and Carvalho and Bergles (1990), the current heater thickness (~1 mm of Aluminum Nitride) was designed to provide CHF data free from thermal conductance/capacitance effects. The experimental CHF values from the reference surface are in good agreement with Zuber's (Zuber, 1959) correlation ($q_{max2}$=13.98 W/cm$^2$ for saturated FC-72). You et al.'s (1992) thin film heater (~0.1 $\mu$m) results in lower CHF values (9.8 W/cm$^2$) for the smooth surface, 70% of $q_{max}$, which can be attributed to the decrease in heater thickness. It is important to note however, that the sprayed alumina surface treatment provided significant heat transfer enhancement on both the thin film and thick (current) heaters. This indicates that the CHF enhancement is dominated by the surface treatment and not the heater thickness increase due to the alumina micro-structure. Based on investigations conducted by Lienhard and Dhir (1973), these two heaters have similar geometrical dimensions (length and width) and significant CHF differences should not be attributed to such effects.

Painted Diamond Micro-Structure Enhancement

Figure 10:
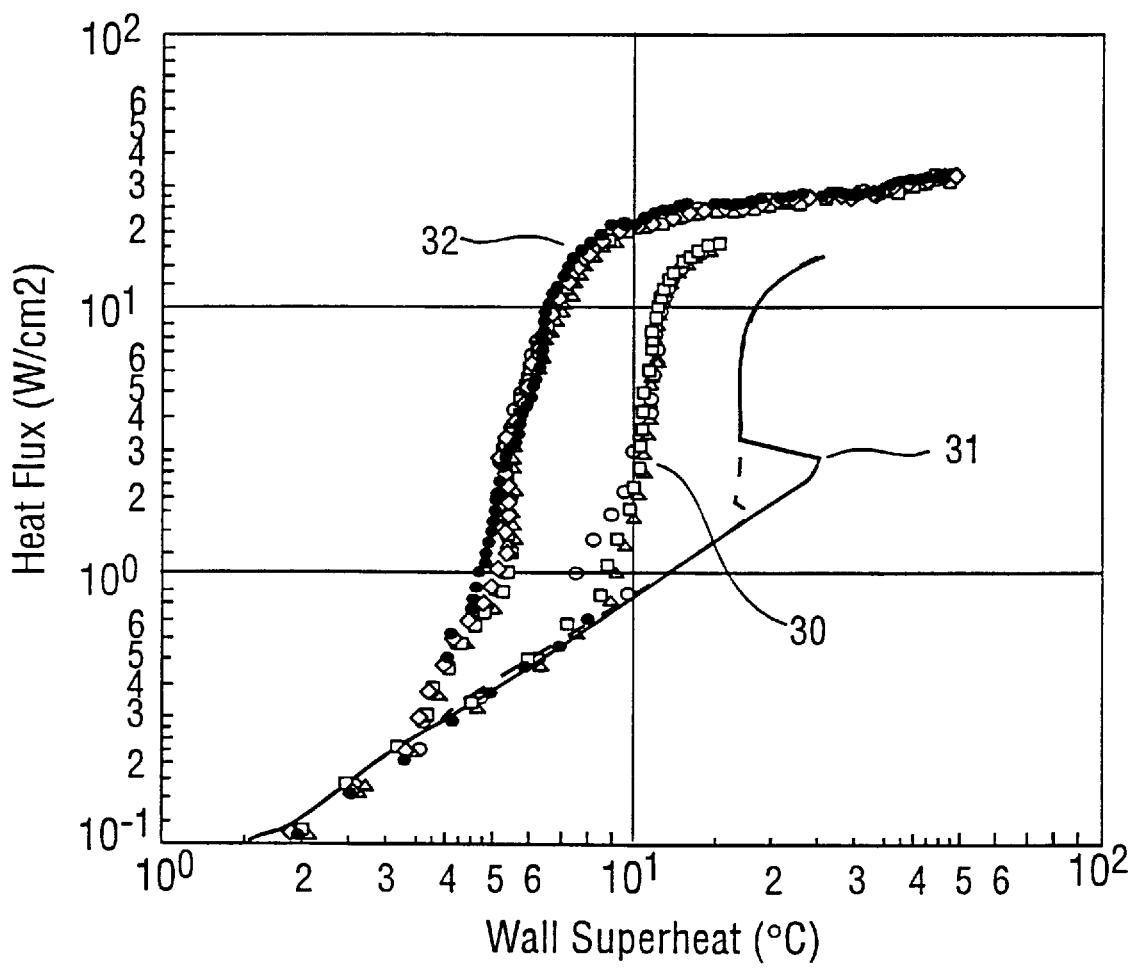
FIG. 10. Pool boiling data from reference surface and diamond paint surface.

FIG. 10 illustrates pool boiling data for the 1–3 μm and 8–12 μm diamond paint micro-structures. Reference surface data are also shown (31) (CHF=14.3 W/cm$^2$). The 1–3 μm diamond micro-structure (30) (CHF=16 W/cm$^2$) had an initial run incipient superheat of –10° C., and on subsequent runs produced partial nucleation of the heated surface between superheats of 4° and 7° C., after which the entire surface became active. The 8–12 μm diamond surface (32) (CHF=29 W/cm$^2$) had an initial run incipient superheat of ~8° C., after which it produced complete and uniform nucleation of the entire surface at ~0.2 W/cm$^2$ (ΔT~3° C.) for subsequent runs. At low heat flux conditions (q<1.5 W/cm$^2$), the observed bubble departure size (less than 0.2 mm) for the painted diamond surfaces was ~4 times smaller, and the departure frequency observably higher, than that from the reference surface, which was in good agreement with FC-72 bubble size predicted by the Cole and Rohsenow (1968) correlation (0.8 mm). The diamond paint micro-structures produced negligible increases in heat transfer surface area, as seen by their natural convection data.

Nucleate boiling data for the painted surfaces is seen to be repeatable (FIG. 10). The painted 1–3 μm diamond and sprayed alumina surface micro-structures produce similar nucleate boiling enhancement with the exception of an increased CHF (~30%) for the sprayed surface. The painted 8–12 μm diamond surface provides an additional ~25% reduction in the nucleate boiling superheats compared to the sprayed alumina or painted 1–3 μm diamond surfaces. The nucleate boiling curve for the 8–12 μm painted surface was observed to have two distinguishable regions. The lower nucleate boiling region (q<20 W/cm$^2$) has a log-log slope of ~5.7 and is characterized by isolated bubble growth and departure with bubble coalescence increasing with increasing heat flux conditions. The higher nucleate boiling region (q>20 W/cm$^2$) has a decreased slope (~0.4) and is characterized by large vapor mushrooms hovering above the heated surface as seen in the silver flake surface. The 8–12 μm painted surface performed better than any other surface at all heat flux conditions, possibly indicating increases in the active nucleation site population and sizes.

The diamond paint surface micro-structures provide repeatable CHF values, with the 1–3 μm surface providing a moderate improvement of ~12% (16 W/cm$^2$), and the 8–12 μm diamond paint providing a significant improvement of ~103% (29 W/cm$^2$), compared to the reference surface. The CHF of the 1–3 μm surface is lower than expected, possibly the result of glue content within the 1–3 μm structure (in comparison to the 8–12 μm surface). In agreement with the conclusions provided in Example 1, it is evident from the current CHF data, that the surface micro-structures play a dominant role in increasing the CHF.

Discussion

The process of entrapping vapor/gas in surface irregularities has been the focus of previous investigations, Bankoff et al. (1958), Tong et al. (1990). It is theorized from visual observations (SEM) of the surface micro-structures, that the diamond paint surface is multi-layered (FIG. 8) and produces more re-entrant cavities. Therefore, the entrapped vapor volume existing in the diamond paint structure should be larger than that over the sprayed surface, and the superheat required for nucleation will be reduced (as observed).

For highly-wetting liquids (e.g. FC-72), Bar-Cohen and Simon (1988) suggested a correlation relating the vapor pressure required to activate a bubble embryo, to the embryonic bubble radius and surface tension:

$$P_{sat}(T_w) - P_{sat}(T_{bulk}) = (2\sigma_{FC-72}(T_w))/r_b \qquad (2)$$

where:

$$\sigma_{FC-72} = 0.042705(1-(T_w \div T_{crit}))^{1.2532}$$

Using the measured wall superheats at the boiling incipience point from each surface, the embryonic bubble radii were calculated using Eq. (2). Table 1 identifies the embryonic bubble radius range for each surface.

TABLE 1

Embryonic Bubble Radii for Different Surface Micro-Structures

| Surface | Incipience Superheat (°C.) | Embryonic Bubble Radius (μm) |
|---|---|---|
| Reference | 20 to 27 | 0.10 to 0.15 |
| Sprayed Alumina (0.3–5 μm) | 9 to 18 | 0.16 to 0.42 |
| Painted Diamand (1–3 μm) | 4 to 10 | 0.40 to 1.44 |
| Painted Diamond (8–12 μm) | 3 to 8 | 0.54 to 2.07 |

The overall variation in embryonic bubble size is significant, showing an increase of up to ~20 times between the reference and 8–12 μm diamond paint surfaces. These embryonic bubble sizes compare favorably with the apparent structure sizes existing among the painted (FIG. 8) and sprayed (You et al., 1992) micro-structures. This analysis illustrates the vapor/gas entrapment capability of the enhanced surfaces.

Effect of Diamond Paint Thickness

Figure 11:
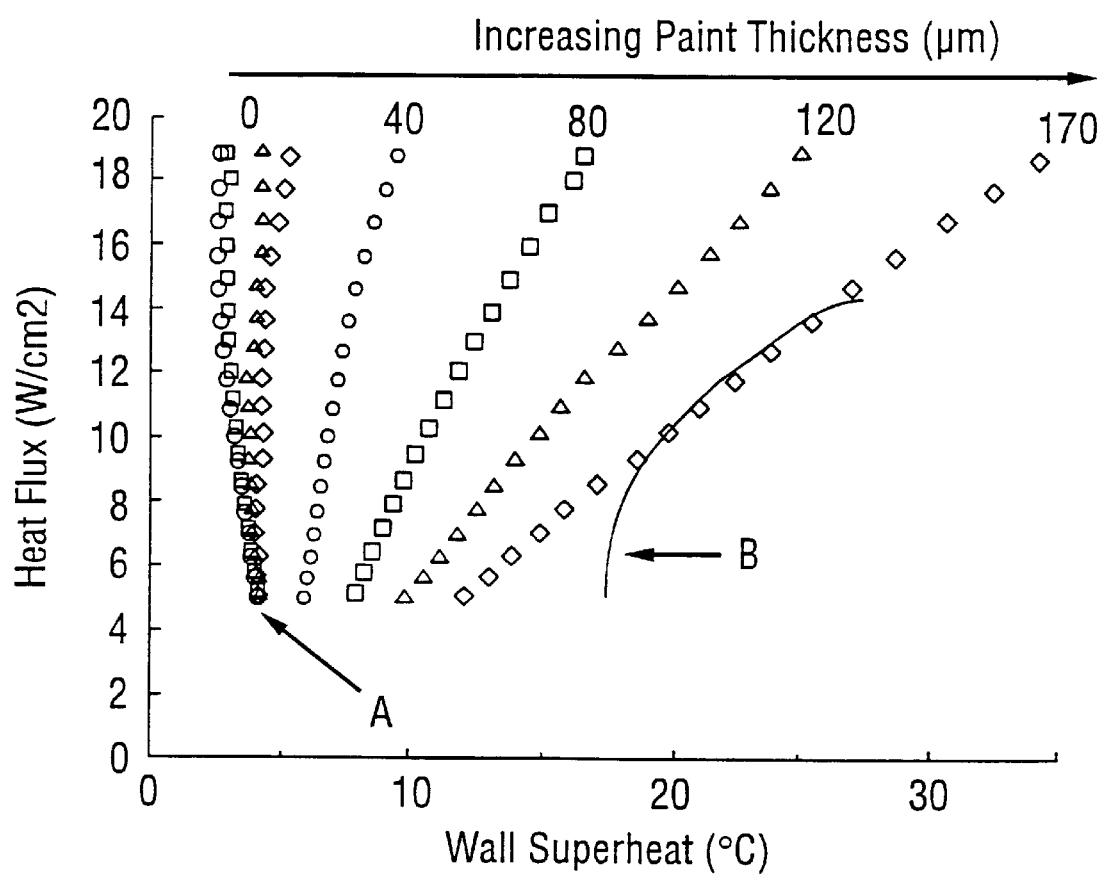
FIG. 11. Data from diamond paint thickness comparison.

FIG. 11 summarizes an investigation which was conducted to determine the penalty associated with application of the 8–12 μm enhancement paint. A single paint mixture was fabricated (1.5 grams 8–12 μm diamond particles/10 ml alcohol/0.1 ml glue) and the enhancement paint thickness was systematically increased by applying successive layers on the reference surface. Pool boiling data between 5 W/cm$^2$ and 19 W/cm$^2$ was generated for four enhanced surfaces, each having a different paint thickness; 40, 80, 120, and 170 μm. Although similar surface conditions were observed to exist for all four painted surfaces (SEM pictures) indicating similar boiling enhancement, the superheat ($\Delta T = T_{ref} - T_{bulk}$) increases due to increased paint thickness. At a thickness of ~170 μm, the decrease in reference surface temperature due to boiling enhancement is nearly equivalent to the increase in reference surface temperature due to the increased thermal resistance of the paint, causing the superheats to approach those of the reference surface (B).

Superheats based on the paint surface temperature ($\Delta T = T_w - T_{bulk}$) were calculated for all four enhanced surfaces and are plotted in FIG. 11 (open symbols) (A). The paint surface temperature was calculated from the following expression: $T_w = T_{ref} - q^*(L/\kappa)_{paint}$ for $\kappa_{paint} = 1.08$ W/m°C. (See Example 1). These superheats represent enhanced conditions with zero paint thickness. If the sprayed alumina nucleate boiling data (FIG. 9) are compared to the painted 114 3 μm diamond nucleate boiling data (FIG. 10), similar enhancement is observed. However, if the penalty associated with the paint thickness is accounted for, the 1–3 μm diamond paint superheats would be reduced between 2° and 4° C., indicating that the actual boiling enhancement of the painted diamond surface is superior to that from the sprayed alumina surface.

Enhancement from Silicon Test Chip

The two surface treatments were applied to a Texas Instruments (TI) silicon test chip to verify their enhancement capability. The test chip was mounted on a metallic substrate using a thermally conductive bond. The silicon chip is 3.1 mm on a side resulting in a projected surface area of 0.096 cm$^2$. Electrical connections from the test chip to the mounting substrate are provided using seven 1.3 μm wires, and those from the substrate to the printed circuit board using eight connectors. A uniformly distributed heat source was provided via joule heating of a 50 Ω resistor mounted in the chip. Junction temperature measurements were made using a diode embedded in the chip through which 1 mA of current was passed. Prior to testing, the diode was calibrated resulting in a voltage versus temperature sensitivity of 1.9 mv/°C.

Figure 12:
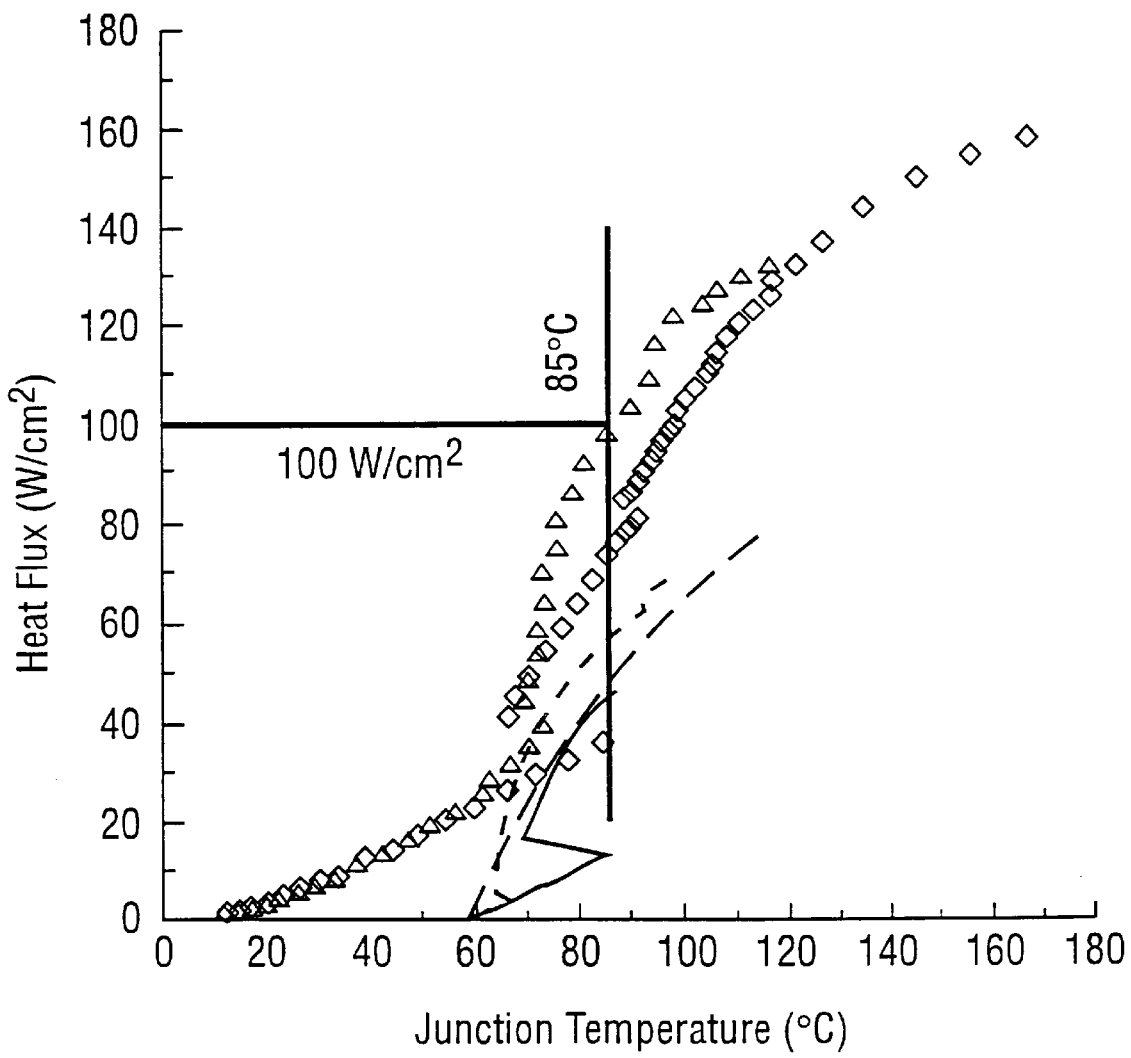
FIG. 12. Silicon test chip data.

Pool boiling test results for saturated and subcooled FC-72 conditions are illustrated in FIG. 12. Heat flux is plotted against chip junction temperature. To quantify the effective heat transfer surface area of the TI chip, the experimental heat flux was compared with that predicted by Goldstein et al. (1973) for horizontally mounted, upward facing, natural convection conditions at four superheat values (5°, 10°, 15°, and 20° C.). The ratios of the heat transfer rates (experimental/predicted) indicate a surface area increase of ~8 times over that of the projected test chip area. Natural convection from the untreated and treated surfaces agrees well, indicating a negligible heat transfer surface area increase due to the enhancement structure.

For saturated conditions, boiling incipience for the untreated chip occurred at a junction temperature of ~86° C. (ΔT=30° C.), for the sprayed alumina surface at ~66° C. (ΔT=10° C.), and that for the painted diamond surface at ~61° C. (ΔT=5° C.). Junction temperature reductions are realized in the nucleate boiling regime, ~7° C. for the alumina surface (in good agreement with simulated chip reductions—FIG. 9) and negligibly small for the diamond paint surface (in poor agreement with simulated chip reductions—FIG. 10). From the data illustrated in FIG. 11, a paint thickness of ~170 μm resulted in superheats similar to those provided by the reference surface. When the diamond paint was applied to the TI test chip, a single drop resulted in a "pool" of paint due to the side walls, leading to the idea that a similar thickness (~170 μm) resulted on the test chip. This "pooling" effect was not a factor in applying the paint to the simulated chip where the paint was allowed to flow over the surface freely, resulting in a paint thickness of ~40 μm.

The untreated surface (solid line) provides a CHF of 49 W/cm$^2$ (~3.5 times the simulated chip due to area increase). The sprayed alumina (short dashes) and diamond paint (long dashes) surface micro-structures increase the CHF by 45% (~71 W/cm$^2$) and 61% (~79 W/cm$^2$), respectively, at saturated conditions. The alumina CHF enhancement compares well with that from the simulated chip (~47%).

FIG. 12 also illustrates the combined effect of surface treatment and subcooling (45° C.). Consider a two-component, two-phase thermodynamic system which is gas-saturated at the bulk temperature of 11° C. (1 atm.). The thermodynamic saturation temperature (of the pure liquid at 1 atm) is 56° C. The subcooling (45° C.) is the difference between 56° C. and 11° C. The subcooled data are indicated by the open symbols, (diamonds, diamond paint, CHF=159 W/cm$^2$; triangles, sprayed alumina, CHF=133 W/cm$^2$) and the effect is significant throughout the nucleate boiling region. Large increases in the CHF compared to those obtained at saturated conditions are realized, 87% (~133 W/cm$^2$) and 101% (~159 W/cm$^2$), for the sprayed alumina and painted diamond surfaces, respectively. Similar CHF increases have been observed for subcooling in FC-72 as reported by Saylor et al. (1988), Mudawwar and Anderson (1989), and Carvalho and Bergles (1990). The combined CHF increase using both surface treatment and subcooling is 171% and 224% for the sprayed alumina and painted diamond surfaces, respectively.

A goal for the thermal management of electronic equipment is energy dissipation rates in excess of 100 W/cm$^2$ while maintaining component surface temperatures below 85° C. Vertical and horizontal lines in FIG. 12 identify this goal. The sprayed alumina data at subcooled conditions provide the goal heat flux of 100 W/cm$^2$ at a junction temperature of 85° C. It is contemplated that if the diamond paint thickness on the TI chip surface could be controlled, superheat reductions similar to those from the simulated chip could be realized. This would allow high heat dissipation rates (100 W/cm$^2$) to be reached at junction temperatures below 85° C.

EXAMPLE 3

Copper Flake Microsurface

This example illustrates the use of copper coatings, which will be the preferred material in certain applications, particularly phase-change heat exchanger systems such as boilers and evaporators, for example, which require chemically-stable and strongly-bonded surface microstructures.

The composition of the present example comprises a glue, a solvent and cavity-generating particles. This composition is applied to a surface and then cured by evaporating the solvent, which causes the glue with embedded particles to be bonded to the surface. The embedded particles provide an increased number of boiling nucleation sites. The composition preferably comprises 1.5 g of copper particles (5–25 μm), 0.3 ml of Devcon Brushable Ceramic Glue, and 10 ml of M.E.K. (methylethyl-ketone) solvent.

Preliminary tests of the efficiency in boiling heat transfer enhancement of the copper coated surface were done in a pool of saturated FC-72. The results are summarized in FIG. 15. The copper surface coating resulted in up to 80% reduction in incipient superheat, 80–91% reduction in nucleate boiling superheats, and about a 100% increase in the Critical Heat Flux (CHF), beyond that of the untreated reference surface. Scanning Electron Microscope (SEM) images show the painted surface to be packed in an ~70 μm thick layer, and to be more tightly packed than the diamond or silver particles of the previous examples.

Figure 15:
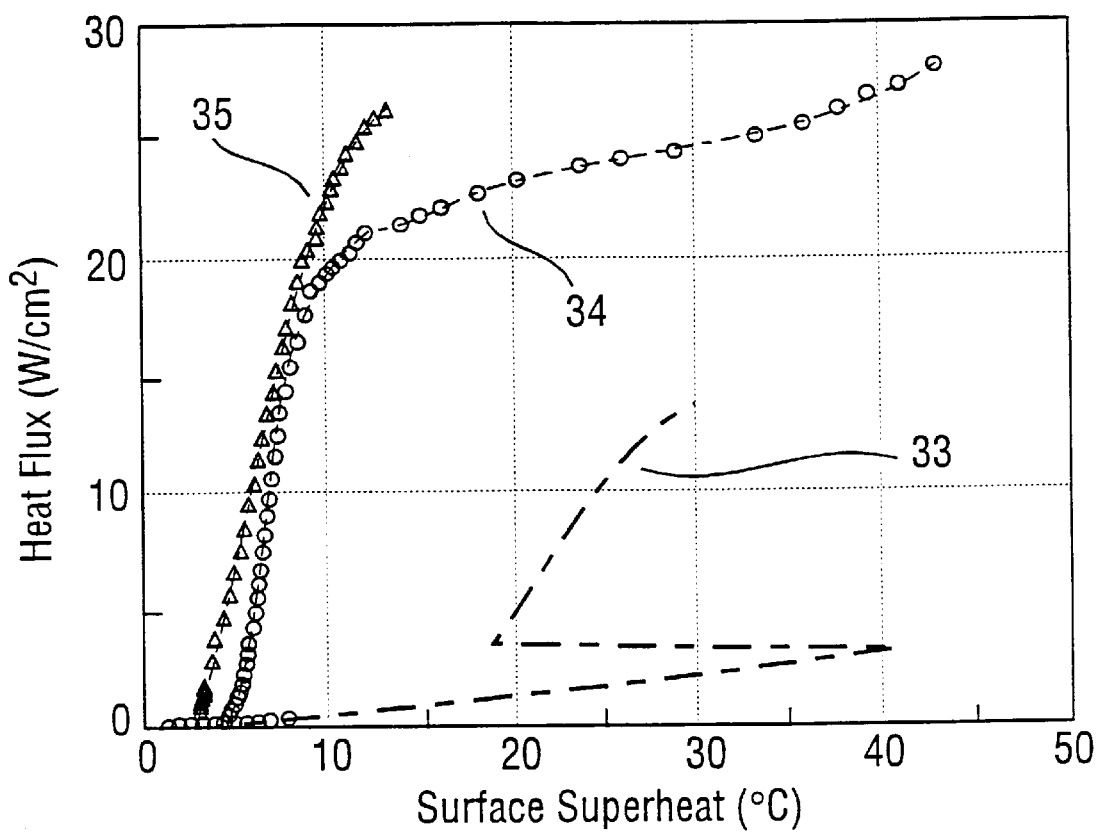
FIG. 15. Pool boiling data from copper coated surface composition study.

The copper coating has advantages in certain applications, for example the cost of the coatings is significantly reduced. Copper particles are at the time of filing significantly cheaper than both diamond (1/250 of the cost) and silver (1/50 of the cost). The enhancement ability of the copper coating in higher heat fluxes near CHF is also superior to that of the diamond and silver coated surfaces. The data in FIG. 15 demonstrate that wall superheat values are much lower with the copper coating for heat fluxes greater than 20 W/cm$^2$. Therefore, the copper surface coating is preferred for applications in which a phase change occurs. In FIG. 15, the data is from pool boiling in saturated FC-72. The triangles (35)

indicate copper 5–25 μm, CHF=26.8 W/cm²; circles (34) are diamond 8–12 μm, CHF=28.3 W/cm²; and the dashed line (33) is the plain surface, CHF=13.8 W/cm².

Figure 16:
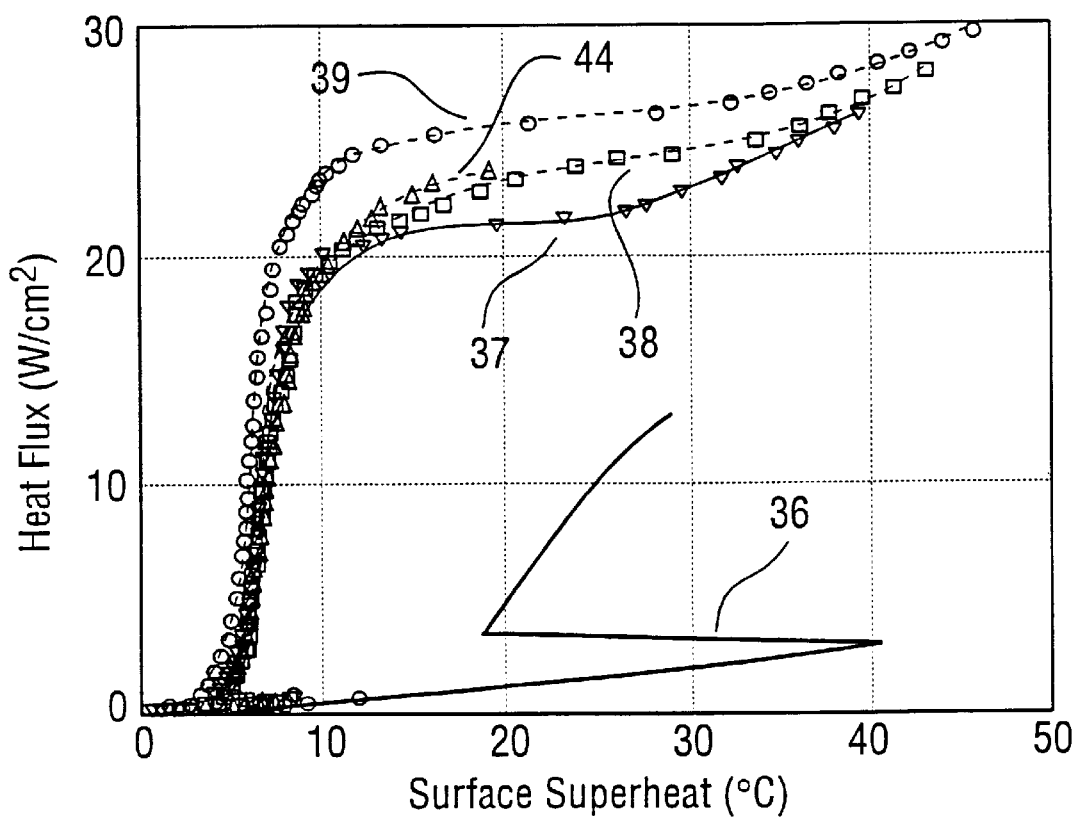
FIG. 16. Summary of pool boiling data from diamond, silver, aluminum and copper coatings.

The boiling enhancement effects of various coatings are summarized in FIG. 16. This data is from pool boiling studies in saturated FC-72. In the figure, Δ (44) is a coating of 1.5 g aluminum (325 mesh=8–11 μm), 0.3 ml Devcon Brushable Ceramic Glue and 10 ml M.E.K. solvent, CHF=30.4; □ (38) is a coating of 1.5 g copper (325 mesh=8–11 μm), 0.4 ml Devcon Brushable Ceramic Glue and 10 ml M.E.K. solvent, CHF=24.0; ∇ (37) is a coating of diamond as described in Example 2, CHF=28.3; and ○ (39) is a silver coating as described in Example 1, CHF=26.4. The plain surface (solid line) (36) had a CHF=13.4 W/cm².

While the compositions and methods of this invention have been described in terms of preferred embodiments, it will be apparent to those of skill in the art that variations may be applied to the composition, methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Anderson, T. M., and Mudawwar, I., 1989, "Microelectronic Cooling by Enhanced Pool Boiling of a Dielectric Fluorocarbon Liquid," Transactions of the ASME Vol. 11, pp. 752–759.

Bankoff, S. G., Hajjar, A. J., and McGlothin, B. B. Jr., "On the Nature and Location of Bubble Nuclei in Boiling from Surfaces," J. of App. Physics, Vol. 29, No. 12, pp. 1739–1741, 1958.

Bar-Cohen, A., Mudawwar, I., and Whalen, B., "Research Needs in Electronic Cooling," Proc. of NSF/Purdue Workshop, Session 6: Future Challenges, pp. 70–77, 1986.

Bar-Cohen, A., and Simon, T. W., 1988, "Wall Superheat Excursions in the Boiling Incipience of Dielectric Fluids," Heat Transfer Eng. 9, pp. 19–31.

Bar-Cohen, A., and McNeil, A., 1992, "Parametric Effects on Pool Boiling Critical Heat Flux in Dielectric Liquids," Proc. of Eng. Foundation Conference, Pool and External Flow Boiling, pp. 171–175.

Carvalho, R. D., and Bergles, A. E., 1990a, "The Influence of Subcooling on the Pool Nucleate Boiling and Critical Heat Flux of Simulated Electronic Chips," Proceedings of the 1990 International Heat Transfer Conference, pp. 289–294.

Carvalho, R. D., and Bergles, A. E., 1990b, "The Effect of Heater Thermal Properties on the Pool Boiling Critical Heat Flux," Third Encontro Nacional de Ciencias Termicas, Itaperna, Brazil.

Chowdhury, R. S. K., and Winterton, R. H. S., 1985, "Surface Effects in Pool Boiling," International Journal of Heat Mass Transfer, Vol. 28, No 10, pp. 1881–1889.

Chu, R. C., and Moran, K. P., "Method for Customizing Nucleate Boiling Heat Transfer from Electronic Units Immersed in Dielectric Coolant," U.S. Pat. No. 4,050,507, Sep. 1977.

Cole, R., and Rohsenow, W. M., 1968, "Correlation of Bubble Departure Diameter for Boiling of Saturated Liquids," Chem. Eng. Prog. Symp. Ser., Vol. 65, No. 92, pp. 211–213.

FLUENT INC., 1991, "Users Manual," Version 4.1.

Gaertner, R. F., 1965, "Photographic Study of Nucleate Pool Boiling on a Horizontal Surface," Trans. Am. Soc. Mech. Engrs., Series C, J. Heat Transfer, Vol. 87: 1, pp. 17–27.

Goldstein, R. J., Sparrow, E. M., and Jones, D. C., "Natural Convection Mass Transfer Adjacent to Horizontal Plates," Int. J. Heat Mass Transfer, Vol. 16, pp. 1025, 1973.

Griffith, P., and Wallis, J. D., 1959, "The Role of Surface Conditions in Nucleate Boiling," Chem. Eng. Prog. Symp. Series, Vol. 56, No. 30, pp. 49–63.

Haramura, Y., and Katto; Y., 1983, "A New Hydrodynamic Model of the Critical Heat Flux, Applicable to both Pool and Forced Convective Boiling on Submerged Bodies in Saturated Liquids", Int. J. Heat Mass Transfer, Vol. 26, pp. 389–399.

Hsu, Y. Y., 1962, "On The Size Range of Active Nucleation Cavities On a Heating Surfaces," J. of Heat Transfer, pp. 207–216.

Incropera, F. P., and Dewitt, D. P., 1990, "Fundamentals of Heat and Mass Transfer", 3rd ed., John Wiley & Sons, New York.

Kline, S. J., and McClintock, F. A., 1953, "Describing Uncertainties in Single-Sample Experiments," Mechanical Engineering, Vol. 75. p. 3–8.

Lienhard, J. H., and V. K. Dhir, "Hydrodynamic Prediction of Peak Pool-Boiling Heat Fluxes from Finite Bodies," J. of Heat Transfer, pp. 152–158, 1973.

Marto, P. J., and Lepere, V. J., 1982, "Pool Boiling Heat Transfer from Enhanced Surfaces to Dielectric Fluids," ASME Jour. of Heat Transfer, Vol. 104, pp. 292–297.

Mudawwar, I., and Anderson, T. M., "High Flux Electronic Cooling by Means of Pool Boiling—Part I: Parametric Investigation of the Effects of Coolant Variation, Pressurization, Subcooling, and Surface Augmentation," ASME HTD-Vol. 111, pp. 25–34, 1989.

Mukutmoni, D., Joshi, Y. K., and Kelleher, M. D., 1993, "Computations for a Three-By-Three Array of Protrusions Cooled By Liquid Immersion: Effect of Substrate Thermal Conductivity," ASME Advances in Electronic Packaging, EEP Vol. 4-2.

O'Connor, J. P., and You, S. M., "A Painting Technique to Enhance Pool Boiling Heat Transfer in Saturated FC-72," Session on Fundamentals of Phase Change, AIAA/ASME Thermophysics Heat Transfer Conference, Colorado Springs, June 1994.

Oktay, S., and Schmeckenbecher, A., "Method for Forming Heat Sinks on Semiconductor Device Chips," U.S. Pat. No. 3,706,127, Dec. 1972.

Park, K. A., and Bergles, A. E., 1986, "Boiling Heat Transfer Characteristics of Simulated Microelectronic Chips with Fluorinert Liquids", HTL-40, Iowa State University, Ames, Iowa.

Rohsenow, W. M., "A Method of Correlating Heat Transfer Data for Surface Boiling of Liquids," Trans. ASME, Vol. 74, pp. 969–976, 1962.

Saylor, J. R., Bar-Cohen, A., Lee, T. Y., Simon, T. W., Tong, W., and Wu, P. S., "Selection and Property Effects on Single and Two-Phase Immersion Cooling," Transactions of the Components, Hybrids and Manufacturing Technology Society, Vol. 11, No. 4, pp. 557–565, 1988.

Thome, J. R., 1990, "Enhanced Boiling Heat Transfer," Hemisphere Pub. Corp., New York, N.Y.

Tong, W., Bar-Cohen, A., Simon, T. W., and You, S. M., "Contact Angle Effects on Boiling Incipience of Highly- Wetting Liquids," Int. J. Heat Mass Transfer, Vol. 33, No. 1, pp. 91–103, 1990.

You, S. M., Simon, T. W., Bar-Cohen, A., and Tong, W., 1990a, "Experimental Investigation of Nucleate Boiling Incipience with a Highly Wetting Dielectric Fluid (R-113)," Int'l. J. of Heat and Mass Transfer, Vol. 33, NO. 1, pp. 105–117.

You, S., Simon, T. W., and Bar-Cohen, A., 1990b, "Experiments on Boiling Incipience with a Highly-Wetted Dielectric Fluid: Effects of Pressure, Subcooling and Dissolved Gas," Proc. of the Ninth Int'l. Heat Transfer Conference, Vol. 2, pp. 337–342, Hemisphere Publishing Co.

You, S. M., Simon, T. W., and Bar-Cohen, A., 1992, "A Technique for Enhancing Boiling Heat Transfer with Application to Cooling of Electronic Equipment," IEEE Trans. CHMT, Vol. 15, No. 5, pp. 90–96.

Zuber, N., 1959, "Hydrodynamic Aspects of Boiling Heat Transfer," AEC Report No. AECU-4439, Physics and Mathematics.

We claim:

1. A composition comprising cavity-generating particles, a glue and a solvent, wherein said glue adheres to said particles and is soluble in said solvent, the particle/glue ratio being 2–15 g/ml glue and the solvent being about 85–98% of the composition.

2. The composition of claim 1 wherein said solvent is selected from the group consisting of acetone, FC-72 and FC-87.

3. The composition of claim 1 wherein said solvent is isopropyl alcohol.

4. The composition of claim 1 wherein said solvent is methylethyl ketone.

5. The composition of claim 1 wherein said glue is a polymer.

6. The composition of claim 1 wherein said glue is selected from the group consisting of violet activated glue and an epoxy glue.

7. The composition of claim 1 wherein said glue is a thermally conductive epoxy.

8. The composition of claim 6 wherein said glue is a brushable ceramic glue.

9. The composition of claim 1 wherein said particles are selected from the group consisting of metal, alloy and ceramic.

10. The composition of claim 1 wherein said particles are selected from the group consisting of silver, copper, aluminum, iron and diamond.

11. The composition of claim 1 wherein said particles are selected from the group consisting of flakes, spheres and randomly shaped particles.

12. The composition of claim 1 wherein said particles are less than 50 $\mu$m in size.

13. The composition of claim 1 wherein said particles are 8–12 $\mu$m in size or less.

14. The composition of claim 1 wherein said particles are 1–3 $\mu$m in size.

15. The composition of claim 1 wherein said particles are present at a concentration of less than or equal to about 15 grams per 1 ml of glue.

16. The composition of claim 1 wherein said particles are present at a concentration of less than or equal to about 10 grams per 1 ml of glue.

17. The composition of claim 1 wherein said particles are present at a concentration of less than or equal to about 5 grams per 1 ml of glue.

18. The composition of claim 1 wherein said particles are present at a concentration of less than or equal to about 3.75 grams per 1 ml of glue.

19. The composition of claim 1 wherein said particles are present at a concentration of about 2 grams per 1 ml of glue.

20. A composition of matter comprising solvent, glue and cavity-generating particles, wherein said composition of matter contains, in relative proportion;

about 10 ml solvent;

about 0.1 ml of glue; and from about 0.2 grams to about 1.5 grams of cavity-generating particles.

21. A composition of matter comprising solvent, glue and cavity-generating particles in a ratio of 10 ml solvent to 0.1 ml glue to 1.5 grams of cavity-generating particles.

22. A composition of matter comprising solvent, glue and cavity-generating particles wherein the composition is 85–98% (v/v) solvent, 0.5–2% (v/v) glue and 1.5–15% (w/v) cavity-generating particles.

23. The composition of claim 20, 21 or 22 wherein said solvent is isopropyl alcohol.

24. The composition of claim 20, 21 or 22 wherein said solvent is methylethyl ketone.

25. The composition of claim 20, 21 or 22 wherein said particles are silver flakes, diamond particles or copper particles.

26. The composition of claim 20, 21 or 22 wherein said glue is an epoxy glue.

27. The composition of claim 20, 21 or 22 wherein said glue is a ceramic glue.

28. A method for enhancing the boiling heat transfer of a surface in contact with a liquid, the method comprising applying to said surface the composition of claim 1.

29. The method of claim 28 wherein said composition is painted, dripped or sprayed onto said surface, or said surface is dipped into said composition.

30. The method of claim 28 wherein said composition forms a layer of 270 $\mu$m or less in thickness after curing.

31. The method of claim 28 wherein said composition forms a layer of 70 $\mu$m or less in thickness after curing.

32. The method of claim 28 wherein said composition forms a layer about 40 $\mu$m or less in thickness after curing.

33. The method of claim 28 wherein said composition forms a layer about 25 $\mu$m or less in thickness after curing.

34. The method of claim 28 wherein said composition forms a layer about 23 $\mu$m in thickness after curing.

35. An object to be immersed in a liquid coolant having a surface comprising cavity-generating particles of less than 50 $\mu$m in size affixed by a glue such that boiling nucleation sites of 05 $\mu$m to 10 $\mu$m width are formed in a density increasing critical heat flux of the surface.

36. The object of claim 35 wherein said particles are selected from the group consisting of diamond, metal, alloy and ceramic.

37. The object of claim 35 wherein said particles are selected from the group consisting of silver, copper, aluminum, diamond and iron.

38. The object of claim 35 wherein said particles are diamond.

39. The object of claim 35 wherein said particles are copper.

40. The object of claim 35 wherein said particles are selected from the group consisting of flakes, spheres and randomly shaped particles.

41. The object of claim 35 wherein said particles are 8–12 $\mu$m in size or less.

42. The object of claim 35 wherein said particles are 1–3 $\mu$m in size.

43. The object of claim 35 wherein said object is a microelectronic component.

44. The microelectronic component of claim 43 further defined as a silicon chip.

* * * * *